(12) United States Patent
Colangelo

(10) Patent No.: US 12,544,642 B2
(45) Date of Patent: Feb. 10, 2026

(54) GOLF PLATFORM FOR TRAINING AND GAMING

(71) Applicant: Mark Colangelo, Orlando, FL (US)

(72) Inventor: Mark Colangelo, Orlando, FL (US)

(*) Notice: Subject to any disclaimer, the term of this patent is extended or adjusted under 35 U.S.C. 154(b) by 298 days.

(21) Appl. No.: 18/362,714

(22) Filed: Jul. 31, 2023

(65) Prior Publication Data
US 2023/0372802 A1  Nov. 23, 2023

Related U.S. Application Data

(63) Continuation-in-part of application No. 17/307,218, filed on May 4, 2021, now Pat. No. 11,801,433, and a continuation-in-part of application No. 17/004,419, filed on Aug. 27, 2020, now abandoned, said application No. 17/307,218 is a continuation-in-part of application No. 15/969,617, filed on May 2, 2018, said application No. 17/004,419 is a continuation-in-part of application No. 15/969,617, filed on May 2, 2018.

(60) Provisional application No. 63/397,804, filed on Aug. 12, 2022, provisional application No. 63/393,356, filed on Jul. 29, 2022, provisional application No. 62/635,229, filed on Feb. 26, 2018, provisional application No. 62/501,015, filed on May 3, 2017.

(51) Int. Cl.
*A63F 13/00* (2014.01)
*A63B 24/00* (2006.01)
*A63B 69/36* (2006.01)

(52) U.S. Cl.
CPC ...... *A63B 69/3676* (2013.01); *A63B 24/0021* (2013.01); *A63B 2024/0028* (2013.01); *A63B 2024/0056* (2013.01)

(58) Field of Classification Search
CPC .............. A63B 2024/0028; A63B 2024/0056
See application file for complete search history.

(56) References Cited

U.S. PATENT DOCUMENTS

| | | | | |
|---|---|---|---|---|
| 2008/0102972 A1* | 5/2008 | Lindsay | ............ | A63B 69/3658 473/223 |
| 2008/0242437 A1* | 10/2008 | Taylor | ............... | A63B 24/0021 473/270 |
| 2009/0036237 A1* | 2/2009 | Nipper | .............. | A63B 24/0006 473/409 |

* cited by examiner

*Primary Examiner* — David L Lewis
*Assistant Examiner* — Eric M Thomas
(74) *Attorney, Agent, or Firm* — Mooney IP

(57) ABSTRACT

A system for detecting, tracking, measuring and analyzing putted golf balls and golfers' putting performance. The system includes a pole securable in a golf hole cup and a capturing device mounted on an upper portion of the pole. The capturing device includes at least one camera and a viewing screen and is for detecting, tracking, measuring and analyzing golf balls putted along the ground and associated golfer performance data. The camera detects a golf ball as it enters the camera field of view, and tracks and stores a path and stopping point coordinates of the golf ball in relation to the golf hole cup, for analysis. Software on the capturing device includes algorithms which analyze individual performance measurements, formulate performance assessments, and provides personalized feedback and instruction output based on data captured by the capturing device.

20 Claims, 31 Drawing Sheets

PUTTING VARIABLE ANALYSIS
SINGLE VARIABLE ANALYSIS                                   EXAMPLES (SEE SPREADSHEET)

501 { MAKE % OR MISS %
      TOTAL PUTTS MADE ÷ TOTAL PUTTS TAKEN 605      60.5%
      TOTAL PUTTS MISS ÷ TOTAL PUTTS TAKEN 606      39.5%

2 VARIABLE ANALYSIS

502 { MISS/LEFT % OR RIGHT %
      TOTAL PUTTS MISS+LEFT ÷ TOTAL PUTTS TAKEN 607      17.7%
      TOTAL PUTTS MISS+RIGHT ÷ TOTAL PUTTS TAKEN 608      21.8%

503 { MISS/SHORT % OR LONG %
      TOTAL PUTTS MISS+SHORT ÷ TOTAL PUTTS TAKEN 610      16.5%
      TOTAL PUTTS MISS+LONG ÷ TOTAL PUTTS TAKEN 612      23.0%

3+++ VARIABLE ANALYSIS

504 { MISS/LEFT/SHORT %
      TOTAL PUTTS MISS+LEFT+SHORT ÷ TOTAL PUTTS TAKEN 611      8.0%

505 { MISS/LEFT/SHORT/L-R SLOPE %
      TOTAL PUTTS MISS+LEFT+SHORT+L-R SLOPING ÷ TOTAL      8.4%
      L-R SLOPE PUTTS TAKEN 904

506 { MISS/LEFT/SHORT/L-R SLOPE/2-4 FEET
      TOTAL MISS/LEFT/SHORT/L-R SLOPE/2-4 FEET ÷ TOTAL 2-4      0.0%
      FEET L-R SLOPE PUTTS TAKEN 902

507 { MISS/LEFT/SHORT/L-R SLOPE/2-4 FEET/RECENT 30 DAYS
      TOTAL MISS/LEFT/SHORT/L-R SLOPE/2-4 FEET
      TOTAL 2-4 FEET L-R SLOPE PUTTS TAKEN

DEMONSTRATING MULTIVARIATE ANALYSIS PRACTICAL VALUE TO USER
DEVICE WILL SHOW USER THEIR WORST PERFORMANCE AREA. CONSIDER THE DIFFERENCE BETWEEN BEING PROVIDED:

508 {
A) MISS RIGHT OVERALL 55.2%, 609 THIS PRESENTS NO INSIGHT INTO CLEAR POTENTIAL ISSUES TO CORRECT. IT INCORRECTLY SEEMS TO TELL USERS THEY GENERALLY NEED TO START THE BALL FURTHER LEFT

B) MISS RIGHT ON L-R SLOPE 70.1%, 801 THIS TAKES INTO ACCOUNT THE PREDOMINANT SLOPE THAT INFLUENCES THE BALL PATH. SO NOW USERS ARE AWARE LEARN THIS L-R SLOPE IS CAUSING THEM A DISPROPORTIONATE RATIO OF MISSES RIGHT THAN ANY OTHER CATEGORY. STILL PARTIAL INFORMATION THAT MIGHT LEAD THEM TO SIMPLY ADJUST THE ALIGNMENT LEFT WHICH C WILL SHOW WOULD BE AN INCORRECT ADJUSTMENT

C) MISS RIGHT+SHORT ON L-R SLOPE 73.9%, 803 HERE MORE IS LEARNED SINCE SHORT PUTTS (WITHOUT SUFFICIENT SPEED) WILL FALL OFF TO THE RIGHT SIDE DUE GRAVITY'S GREATER INFLUENCE ON SLOWER MOVING OBJECT. THIS DISPROPORTIONATELY HIGH STAT ALERTS THE USER THAT THE ADJUSTMENT NEEDING MADE IS SPEED NOT ALIGNMENT OR BALL PATH

*EACH ADDITIONAL VARIABLE PROVIDES MORE RELEVANT FEEDBACK FOR THE USER

PUTTS: SLOPE=L>R — 601

| LENGTH (FEET) | ALL L>R PUTTS | <MAKE ALL> | | <MISS ALL> | | <MISS=LEFT> | | | <MISS=RIGHT> | | |
|---|---|---|---|---|---|---|---|---|---|---|---|
| | | MAKE | % VS. ALL | MISS | % VS. ALL | (L) MISS | % VS. ALL | % VS. MISS | (R) MISS | % VS. ALL | % VS. MISS |
| 2 | 39 | 35 | 89.7% | 4 | 10.3% | 1 | 2.6% | 25.0% | 3 | 7.7% | 75.0% |
| 3 | 50 | 45 | 90.0% | 5 | 10.0% | 2 | 4.0% | 40.0% | 3 | 6.0% | 60.0% |
| 4 | 82 | 73 | 89.0% | 9 | 11.0% | 3 | 3.7% | 33.3% | 6 | 7.3% | 66.7% |
| 5 | 111 | 97 | 87.4% | 14 | 12.6% | 6 | 5.4% | 42.9% | 8 | 7.2% | 57.1% |
| 6 | 157 | 70 | 44.6% | 87 | 55.4% | 26 | 16.6% | 29.9% | 61 | 38.9% | 70.1% |
| 7 | 114 | 69 | 60.5% | 45 | 39.5% | 23 | 20.2% | 51.1% | 22 | 19.3% | 48.9% |
| 8 | 142 | 74 | 52.1% | 68 | 47.9% | 31 | 21.8% | 45.6% | 37 | 26.1% | 54.4% |
| 9 | 100 | 43 | 43.0% | 57 | 57.0% | 30 | 30.0% | 52.6% | 27 | 27.0% | 47.4% |
| 10 | 78 | 22 | 28.2% | 56 | 71.8% | 29 | 37.2% | 51.8% | 27 | 34.6% | 48.2% |
| 15 | 68 | 16 | 23.5% | 52 | 76.5% | 30 | 44.1% | 57.7% | 22 | 32.4% | 42.3% |
| 20 | 30 | 3 | 10.0% | 27 | 90.0% | 13 | 43.3% | 48.1% | 14 | 46.7% | 51.9% |
| | 971 | 547 | 56.3% | 424 | 43.7% | 194 | 20.0% | 45.8% | 230 | 23.7% | 54.2% |

| LENGTH (FEET) | <SHORT ALL> | | | <SHORT-LEFT> | | | | <SHORT-RIGHT> | | | |
|---|---|---|---|---|---|---|---|---|---|---|---|
| | (-) MISS | % VS. ALL | % VS. MISS | (-) MISS L | % VS. ALL | % VS. MISS | % VS. SHORT | (-) MISS R | % VS. ALL | % VS. MISS | % VS. SHORT |
| 2 | 3 | 7.7% | 75.0% | 0 | 0.0% | 0.0% | 0.0% | 3 | 7.7% | 75.0% | 100.0% |
| 3 | 3 | 6.0% | 60.0% | 1 | 2.0% | 20.0% | 33.3% | 2 | 4.0% | 40.0% | 66.7% |
| 4 | 5 | 6.1% | 55.6% | 1 | 1.2% | 11.1% | 20.0% | 4 | 4.9% | 44.4% | 80.0% |
| 5 | 7 | 6.3% | 50.0% | 3 | 2.7% | 21.4% | 42.9% | 4 | 3.6% | 28.6% | 57.1% |
| 6 | 23 | 14.6% | 26.4% | 6 | 3.8% | 6.9% | 26.1% | 17 | 10.8% | 19.5% | 73.9% |
| 7 | 25 | 21.9% | 55.6% | 10 | 8.8% | 22.2% | 40.0% | 15 | 13.2% | 33.3% | 60.0% |
| 8 | 31 | 21.8% | 45.6% | 14 | 9.9% | 20.6% | 45.2% | 17 | 12.0% | 25.0% | 54.8% |
| 9 | 30 | 30.0% | 52.6% | 16 | 16.0% | 28.1% | 53.3% | 14 | 14.0% | 24.6% | 46.7% |
| 10 | 29 | 37.2% | 51.8% | 12 | 15.4% | 21.4% | 41.4% | 17 | 21.8% | 30.4% | 58.6% |
| 15 | 23 | 33.8% | 44.2% | 10 | 14.7% | 19.2% | 43.5% | 13 | 19.1% | 25.0% | 56.5% |
| 20 | 17 | 56.7% | 63.0% | 9 | 30.0% | 33.3% | 52.9% | 8 | 26.7% | 29.6% | 47.1% |
| | 196 | 20.2% | 48.2% | 82 | 8.4% | 19.3% | 41.8% | 114 | 11.7% | 28.9% | 58.2% |

Fig. 6B

| LENGTH (FEET) | <LONG ALL> (+) MISS | % VS. ALL | % VS. MISS | <LONG+LEFT> (+) MISS L | % VS. ALL | % VS. MISS | % VS. LONG | <LONG+RIGHT> (+) MISS R | % VS. ALL | % VS. MISS | % VS. LONG |
|---|---|---|---|---|---|---|---|---|---|---|---|
| 2 | 1 | 2.5% | 25.0% | 0 | 0.0% | 0.0% | 0.0% | 1 | 2.5% | 25.0% | 100.0% |
| 3 | 2 | 4.0% | 40.0% | 1 | 2.0% | 20.0% | 50.0% | 1 | 2.0% | 20.0% | 50.0% |
| 4 | 4 | 4.9% | 44.4% | 1 | 1.2% | 11.1% | 25.0% | 3 | 3.7% | 33.3% | 75.0% |
| 5 | 7 | 6.3% | 50.0% | 2 | 1.8% | 14.3% | 28.6% | 5 | 4.5% | 35.7% | 71.4% |
| 6 | 64 | 40.8% | 73.6% | 9 | 5.7% | 10.3% | 14.1% | 55 | 35.0% | 63.2% | 85.9% |
| 7 | 20 | 17.5% | 44.4% | 12 | 10.5% | 26.7% | 60.0% | 8 | 7.0% | 17.8% | 40.0% |
| 8 | 37 | 26.1% | 54.4% | 17 | 12.0% | 25.0% | 45.9% | 20 | 14.1% | 29.4% | 54.1% |
| 9 | 27 | 27.0% | 47.4% | 9 | 9.0% | 15.8% | 33.3% | 18 | 18.0% | 31.6% | 66.7% |
| 10 | 27 | 34.6% | 48.2% | 14 | 17.9% | 25.0% | 51.9% | 13 | 16.7% | 23.2% | 48.1% |
| 15 | 29 | 42.6% | 55.8% | 18 | 26.5% | 34.6% | 62.1% | 11 | 16.2% | 21.2% | 37.9% |
| 20 | 10 | 33.3% | 37.0% | 4 | 13.3% | 14.8% | 40.0% | 6 | 20.0% | 22.2% | 60.0% |
|  | 228 | 23.5% | 53.8% | 87 | 9.0% | 20.5% | 38.2% | 141 | 14.5% | 33.3% | 61.8% |

Fig. 6C

| LENGTH (FEET) | PUTTS: ALL<br>ALL PUTTS | <MAKE ALL><br>MAKE | % VS. ALL | <MISS ALL><br>MISS | % VS. ALL | <MISS-LEFT><br>(L) MISS | % VS. ALL | % VS. MISS | <MISS-RIGHT><br>(R) MISS | % VS. ALL | % VS. MISS |
|---|---|---|---|---|---|---|---|---|---|---|---|
| 2 | 124 | 117 | 94.4% | 7 | 5.6% | 3 | 2.4% | 42.9% | 4 | 3.2% | 57.1% |
| 3 | 145 | 125 | 86.2% | 20 | 13.8% | 7 | 4.8% | 35.0% | 13 | 9.0% | 65.0% |
| 4 | 265 | 208 | 78.5% | 57 | 21.5% | 28 | 10.6% | 49.1% | 29 | 10.9% | 50.9% |
| 5 | 328 | 247 | 75.3% | 81 | 24.7% | 36 | 11.0% | 44.4% | 45 | 13.7% | 55.6% |
| 6 | 493 | 320 | 64.9% | 173 | 35.1% | 48 | 9.7% | 27.7% | 125 | 25.4% | 72.3% |
| 7 | 357 | 235 | 65.8% | 122 | 34.2% | 55 | 15.4% | 45.1% | 67 | 18.8% | 54.9% |
| 8 | 412 | 232 | 56.3% | 180 | 43.7% | 92 | 22.3% | 51.1% | 88 | 21.4% | 48.9% |
| 9 | 301 | 140 | 46.5% | 161 | 53.5% | 73 | 24.3% | 45.3% | 88 | 29.2% | 54.7% |
| 10 | 241 | 87 | 36.1% | 154 | 63.9% | 75 | 31.1% | 48.7% | 79 | 32.8% | 51.3% |
| 15 | 167 | 46 | 27.5% | 121 | 72.5% | 62 | 37.1% | 51.2% | 59 | 35.3% | 48.8% |
| 20 | 110 | 24 | 21.8% | 86 | 78.2% | 42 | 38.2% | 48.8% | 44 | 40.0% | 51.2% |
| | 2943 | 1781 | 60.5% | 1162 | 39.5% | 521 | 17.7% | 44.8% | 641 | 21.8% | 55.2% |

Fig. 6D

| LENGTH (FEET) | <SHORT ALL> | | | <SHORT+LEFT> | | | | <SHORT+RIGHT> | | | |
|---|---|---|---|---|---|---|---|---|---|---|---|
| | (-) MISS | % VS. ALL | % VS. MISS | (-) MISS L | % VS. ALL | % VS. MISS | % VS. SHORT | (-) MISS R | % VS. ALL | % VS. MISS | % VS. SHORT |
| 2 | 1 | 0.8% | 14.3% | 0 | 0.0% | 0.0% | 0.0% | 1 | 0.8% | 14.3% | 100.0% |
| 3 | 3 | 2.1% | 15.0% | 1 | 0.7% | 5.0% | 33.3% | 2 | 1.4% | 10.0% | 66.7% |
| 4 | 12 | 4.5% | 21.1% | 5 | 1.9% | 8.8% | 41.7% | 7 | 2.6% | 12.3% | 58.3% |
| 5 | 23 | 7.0% | 28.4% | 12 | 3.7% | 14.8% | 52.2% | 11 | 3.4% | 13.6% | 47.8% |
| 6 | 43 | 8.7% | 24.9% | 19 | 3.9% | 11.0% | 44.2% | 24 | 4.9% | 13.9% | 55.8% |
| 7 | 42 | 11.5% | 34.4% | 22 | 6.2% | 18.0% | 52.4% | 20 | 5.6% | 16.4% | 47.6% |
| 8 | 92 | 22.3% | 51.1% | 40 | 9.7% | 22.2% | 43.5% | 52 | 12.6% | 28.9% | 56.5% |
| 9 | 82 | 27.2% | 50.9% | 39 | 13.0% | 24.2% | 47.6% | 43 | 14.3% | 26.7% | 52.4% |
| 10 | 75 | 31.1% | 48.7% | 40 | 16.6% | 26.0% | 53.3% | 35 | 14.5% | 22.7% | 46.7% |
| 15 | 68 | 40.7% | 56.2% | 33 | 19.8% | 27.3% | 48.5% | 35 | 21.0% | 28.9% | 51.5% |
| 20 | 45 | 40.9% | 52.3% | 24 | 21.8% | 27.9% | 53.3% | 21 | 19.1% | 24.4% | 46.7% |
| | 486 | 16.5% | 41.8% | 235 | 8.0% | 20.2% | 48.4% | 251 | 8.5% | 21.6% | 51.6% |

Fig. 6E

| LENGTH (FEET) | <LONG ALL> | | | <LONG+LEFT> | | | | <LONG+RIGHT> | | | |
|---|---|---|---|---|---|---|---|---|---|---|---|
| | (+) MISS | % VS. ALL | % VS. MISS | (+) MISS L | % VS. ALL | % VS. MISS | % VS. LONG | (+) MISS R | % VS. ALL | % VS. MISS | % VS. LONG |
| 2 | 6 | 4.6% | 85.7% | 2 | 1.6% | 28.6% | 30.3% | 4 | 3.2% | 57.1% | 66.7% |
| 3 | 17 | 11.7% | 85.0% | 8 | 5.5% | 40.0% | 47.1% | 9 | 6.2% | 45.0% | 52.9% |
| 4 | 45 | 17.0% | 78.9% | 25 | 9.4% | 43.9% | 55.6% | 20 | 7.5% | 35.1% | 44.4% |
| 5 | 58 | 17.7% | 71.6% | 25 | 7.6% | 30.9% | 43.1% | 33 | 10.1% | 40.7% | 55.9% |
| 6 | 130 | 26.4% | 76.1% | 40 | 9.7% | 27.7% | 36.9% | 40 | 8.1% | 23.1% | 30.8% |
| 7 | 80 | 22.4% | 65.6% | 48 | 13.4% | 39.3% | 60.0% | 32 | 9.0% | 23.2% | 40.0% |
| 8 | 88 | 21.4% | 48.9% | 46 | 11.2% | 25.6% | 52.3% | 42 | 10.2% | 23.3% | 47.7% |
| 9 | 79 | 26.2% | 49.3% | 44 | 14.6% | 27.3% | 55.7% | 35 | 11.6% | 21.7% | 44.3% |
| 10 | 79 | 32.6% | 51.3% | 46 | 19.1% | 29.9% | 58.2% | 33 | 13.7% | 21.4% | 41.8% |
| 15 | 53 | 31.7% | 43.8% | 28 | 16.8% | 23.1% | 52.8% | 25 | 15.0% | 20.7% | 47.2% |
| 20 | 41 | 37.3% | 47.7% | 21 | 19.1% | 24.4% | 51.2% | 20 | 18.2% | 23.3% | 48.8% |
| | 676 | 23.0% | 58.2% | 341 | 11.6% | 29.3% | 50.4% | 283 | 10.0% | 25.2% | 49.3% |

PUTTS, SLOPE = LEFT → RIGHT (815)

| LENGTH (FEET) | ALL PUTTS | <MAKE ALL> MAKE | % VS. ALL | <MISS ALL> MISS | % VS. ALL | <MISS→LEFT> (L) MISS | % VS. ALL | % VS. MISS | <MISS→RIGHT> (R) MISS | % VS. ALL | % VS. MISS |
|---|---|---|---|---|---|---|---|---|---|---|---|
| 2 | 39 | 35 | 89.7% | 4 | 10.3% | 1 | 2.6% | 25.0% | 3 | 7.7% | 75.0% |
| 3 | 50 | 45 | 90.0% | 5 | 10.0% | 2 | 4.0% | 40.0% | 3 | 6.0% | 60.0% |
| 4 | 82 | 73 | 89.0% | 9 | 11.0% | 3 | 3.7% | 33.3% | 6 | 7.3% | 66.7% |
| 5 | 111 | 97 | 87.4% | 14 | 12.6% | 6 | 5.4% | 42.9% | 8 | 7.2% | 57.1% |
| 6 | 157 | 115 | 73.2% | 42 | 26.8% | 20 | 12.7% | 47.6% | 22 | 14.0% | 52.4% |
| 7 | 114 | 69 | 60.5% | 45 | 39.5% | 23 | 20.2% | 51.1% | 22 | 19.3% | 48.9% |
| 8 | 142 | 74 | 52.1% | 68 | 47.9% | 31 | 21.8% | 45.6% | 37 | 26.1% | 54.4% |
| 9 | 100 | 43 | 43.0% | 57 | 57.0% | 30 | 30.0% | 52.6% | 27 | 27.0% | 47.4% |
| 10 | 78 | 22 | 28.2% | 56 | 71.8% | 29 | 37.2% | 51.8% | 27 | 34.6% | 48.2% |
| 15 | 68 | 16 | 23.5% | 52 | 76.5% | 30 | 44.1% | 57.7% | 22 | 32.4% | 42.3% |
| 20 | 30 | 3 | 10.0% | 27 | 90.0% | 13 | 43.3% | 48.1% | 14 | 46.7% | 51.9% |
| All | 971 | 582 | 60.0% | 379 | 39.0% | 188 | 19.4% | 49.6% | 191 | 19.7% | 50.0% |

FROM FIG. 8A (A)

816 → OUTPUTS: MOBILE APP, DEVICE DISPLAY

800

GOLF PLATFORM FOR TRAINING AND GAMING

CROSS-REFERENCE TO RELATED APPLICATIONS

This application claims the benefit of U.S. patent application Ser. No. 17/307,218, filed on May 4, 2021, which claims the benefit of U.S. Provisional Patent Application Ser. No. 62/635,229, filed on Feb. 26, 2018, and United States Provisional Patent Application Ser. No. 62/501,015, filed on May 3, 2017, all of which are incorporated by reference herein in their entirety. This application also claims the benefit of U.S. patent application Ser. No. 17/004,419, filed on Aug. 27, 2020, which claims the benefit of U.S. patent application Ser. No. 15/969,617, filed on May 2, 2018, which claims the benefit of U.S. Provisional Patent Application Ser. No. 62/635,229, filed on Feb. 26, 2018, and U.S. Provisional Patent Application Ser. No. 62/501,015, filed on May 3, 2017, all of which are incorporated by reference herein in their entirety. This application also claims the benefit of U.S. Provisional Patent Application Ser. No. 63/393,356, filed on Jul. 29, 2022, and U.S. Provisional Patent Application Ser. No. 63/397,804, filed on Aug. 12, 2022, all of which are incorporated by reference herein in their entirety.

COPYRIGHT STATEMENT

A portion of the disclosure of this patent document may contain material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks that may be used in the disclosure of the invention, and the applicants, make no claim to any trademarks referenced.

BACKGROUND OF THE INVENTION

1. Field of the Invention

The present invention relates to sporting equipment and includes a combination of a base unit, including a mobile device or terminal, a mobile application within a mobile device or terminal having a graphical user interface (GUI) for displaying formatted data, a data collection and storage component, and an analysis engine for capturing, aggregating, synthesizing, analyzing and processing data. More specifically, the present invention is directed to a custom camera and viewing screen and associated software which is mounted on the top of a telescoping pole secured in a golf hole cup for detecting, tracking, measuring and analyzing putted golf balls and associated golfer performance data in putting. The system may also include software in order to provide gaming function for virtual or local play by one or more players.

2. Description of Related Art

"Putting" in golf refers to the practice of hitting a golf ball along the ground or "green" into a hole, an activity requiring practice to develop the feel for line, speed, and accuracy. Putting is the most utilized aspect of the game of golf, considering it must be done on every hole to complete the hole. As such, about 45% of an average golfer's scores are putting strokes. Current products aim to assist golfers in alignment, best in practice stroke techniques, building muscle memory, distance control, reading greens, among other areas, all of which are primarily involved in the measure of and influence on the swing of the putter.

There are a variety of passive products aimed at enhancing a user's golf putting practice, among them floor mats and ramp constructions with actual or simulated holes. While ramp constructions with actual holes can provide a semi-realistic experience, they generally require a large space to set up and use. Floor mats which are flush with the ground can be more compact but rely on flat or shallow simulated target holes, making it sometimes difficult to tell if a shot was made or missed. In addition, because these are passive apparatuses, a user desiring some record of their putting practice must observe and record each shot manually. At best, there are products that simply count the number of strokes you make into the hole, but not in relation to the total number of attempts or the location of misses. Further, such conventional products do not have a means to capture, collect, process and analyze putting statistical records so as to provide the user with actionable feedback for improving the user's performance. There exists no platform or solution in this domain that uses multivariate putting performance data or analysis which is based directly on data-based proficiency of putting a ball to a target; nor is there computer-driven modeling that correlates this performance data and analysis to produce instructional guidance specific to each user so as to inform a user to their specific low-performance areas to focus on improving their putting.

An active device could make use of sensors to accurately and automatically determine the position and/or velocity of a putted golf ball with reference to a virtual hole. There are a variety of mechanical sensors which can be used to sense impact force and/or location, among them accelerometers which detect movement, vibration, or impact; and piezoelectric sensors which produce an electric charge when deformed by a force. In addition, a variety of remote sensors exist which are able to determine the position and velocity of an object over a distance. These are broadly referred to as motion detectors. They include passive infrared sensors, which measure infrared light radiating from objects, microwave and ultrasonic motion detectors which emit microwave radiation and high-frequency sound waves, respectively, and then detect resulting reflections, and digital video cameras combined with a computer program which applies motion analysis to the generated videos, allowing for object tracking. This type of analysis is retained in memory for later analysis with additional data.

What is needed is a capturing device, mobile device or terminal such as a smart phone which combines a microprocessor and computer memory with several methods of remote communication (e.g., a network connection, or other wireless communication channel), a camera, and a user-interface which accepts and displays information. This makes them an excellent platform for interfacing with a base unit and objects. In addition, they provide storage of and access to information in a local, convenient location for a user.

SUMMARY OF THE INVENTION

Bearing in mind the problems and deficiencies of the prior art, it is therefore an object of the present invention to provide a system for improving a golfer's performance in putting.

It is another object of the present invention to provide a gaming platform for a mobile device simulating a top field view of a golf hole, enabling users to play competitive games, including live over a wireless communication system, against themselves, against the app, or against other players.

A further object of the invention is to provide a system for analyzing individual golf putting performance and providing feedback and instruction based on the analyzed data.

It is still another object of the present invention to provide a system and software for a gaming function for virtual play by one or more players.

Still other objects and advantages of the invention will in part be obvious and will in part be apparent from the specification.

The above and other objects, which will be apparent to those skilled in the art, are achieved in the present invention which is directed to a putting instruction and analytics platform, comprising: a base unit configured to capture, measure and analyze a golf ball on a putting surface by operably receiving stimuli related to the state of a golf ball on a putting surface and the location of the target hole; a processor coupled to the base unit operable to digitize said stimuli into input data; an analytics engine comprising software in the form of computer instructions stored on a computer readable medium and executed by a processor, the analytics engine operable to (i) correlate the input data with at least one external variable, (ii) using an algorithm, process the correlated input data and at least one external variable to obtain a result and (iii) output the result that quantifies the putt as Made, Missed; Missed Right, and Missed Left from said target hole.

Another aspect of the present invention is directed to the putting instruction and analytics platform as described above wherein the stimuli is at least one selected from the group consisting of location of the golf ball relative to a start position on a putting surface and an actual or virtual target or target hole, speed, velocity, acceleration and deceleration of the golf ball over a selected length of travel, golf ball force at any time prior to, and upon impacting or reaching the actual or virtual target or target hole, spin of the golf ball at any time prior to, and upon reaching or impacting the actual or virtual target or target hole and lift of the golf ball off a club face.

Another aspect of the present invention is directed to the putting instruction and analytics platform as described above wherein at least one external variable is one selected from the group consisting of user position, actual or virtual target location, actual or virtual target hole location, gradient between selected locations, wind velocity, wind acceleration, characteristics of a putting surface, including attributed speed based on the measurement of static and dynamic co-efficient of friction and obstacles.

Another aspect of the present invention is directed to the putting instruction and analytics platform as described above wherein at least one of the at least one external variable are previously stored in a memory accessible by the processor.

Another aspect of the present invention is directed to the putting instruction and analytics platform as described above wherein at least one of the at least one external variable are sensed, collected and stored in a memory accessible by the processor contemporaneously with the receipt of stimuli related to the state of the golf ball.

Another aspect of the present invention is directed to the putting instruction and analytics platform as described above wherein the external variables comprise spatial orientation of ball relative to a target, speed and velocity of the ball, when impacting target compared to an acceptable speed range, spin of the ball, lift of the ball off club face, and a visual representation of the putting stroke.

Another aspect of the present invention is directed to the putting instruction and analytics platform as described above further comprising a display for displaying the output results.

Another aspect of the present invention is directed to the putting instruction and analytics platform as described above wherein the stimuli is received in the base unit using a sensor selected from the group consisting of a camera, motion detector, infrared sensor, sonar, and acoustic sensor and an at least one external variable is received using a sensor selected from the group consisting of a keypad, mouse, touchscreen, camera, infrared sensor, sonar, wind vane, friction detector and motion detector.

Another aspect of the present invention is directed to the putting instruction and analytics platform as described above wherein the output result comprises a user's putting performance results, relating to putting line, speed, accuracy and distance control.

Another aspect of the present invention is directed to the putting instruction and analytics platform as described above wherein the base unit comprises a mobile device or terminal.

Another aspect of the present invention is directed to the putting instruction and analytics platform as described above wherein the base unit is coupled to a mobile device or terminal over a wired or WIFI, Bluetooth, RTM, cellular or similar radio spectrum link.

Another aspect of the present invention is directed to the putting instruction and analytics platform as described above wherein the base unit further comprises: a housing being made of a rigid material, preferably a hard plastic such as polyvinyl chloride; a sensing circuit for sensing position and velocity of a putted golf ball on a putting surface in close proximity to a user-facing side of said housing; a microprocessor running base unit firmware for driving a camera and I/O; a signal conditioning circuit for conditioning sensor data such that it is readable by said microprocessor, a transceiver for remotely communicating video data to a mobile terminal or device; a recording module for video recording a user's putting stroke from the vantage point of a simulated target; and a power source.

Another aspect of the present invention is directed to the putting instruction and analytics platform as described above wherein at least one of the input data, external variables, algorithm and output are transmitted and stored in a remote or distributed server.

Another aspect of the present invention is directed to the putting instruction and analytics platform as described above wherein the input data, external variables, algorithm and output are collected, transmitted and stored in a remote or distributed server and machine learning and artificial intelligence techniques are applied thereto to provide insights into the user's past, current and predicted performance.

Another aspect of the present invention is directed to golf instruction method, apparatus and analytics platform for determining the state of a putted golf ball relative to a target using information about the golf ball and external variables and remotely displaying the same comprising a base unit, a mobile device or terminal, and an associated computer program including an analytics engine for analyzing a user's performance. The computer program determines the exact location coordinates a putted golf ball has missed said target and then stores, aggregates and displays that information for a user. The analytics engine is operable to aggregate data, analyze data and then correlate a user's actual skill proficiency to ball performance.

The invention is an apparatus combining a base unit having a transceiver, the base unit with a camera interfaced via a wireless or wired channel to a standalone mobile device or terminal, the mobile device or terminal operable to (i) receive video data from the base unit, and (ii) store, aggregate, process, format and display the processed, formatted data to the user at the mobile device or terminal. The invention is further operable to analyze the data using a variety of analysis techniques and present the analyzed data to the user in a format so as to allow the user to improve putting performance such as, but not limited to assisting golfers in understanding data and analytics of their performance results to identify specific putting strengths, and more importantly putting weaknesses. From this awareness of weaknesses, instruction is provided that addresses specific tendencies related to but not limited to alignment, stroke techniques, muscle memory, distance control and reading greens which supports skill improvement in these areas.

The invention uses, among other things, video data plus actual ball performance data. A variety of products exist that employ video alone for subjective assessment, meaning the user is only able to view the video to determine by self-diagnosis any abnormalities which are obvious to the unaided eye to correct. Other products exist that use video data in tandem with sensors that capture data about the user physical mechanics or the mechanics of the sporting equipment, such as the golf putter during user's use. Output data can be specific to the user or the equipment such as swing path, angles, swing speed; analytics regarding the proficiency of the user compared to best practices or professional metrics; feedback that contrasts the user to the best mechanics in the sport. The other products target relevant swing mechanics, but not the specific data of the putted ball or analytics of results of the putted ball.

In the invention, video recording may be used to sense motion and cue the video; capture the ball from point of origin to end point; and determine spatial orientation of ball relative to target, exact location, distance, and path, based on coordinates such as Cartesian, polar, or other 2-dimensional plotting system; end point: made/missed; missed: left/right, short/long; speed and velocity of the ball when impacting or bypassing target compared to an acceptable speed range; spin of the ball; and lift of the ball off club face.

The analytics engine of the invention receives user positioning and motion, full continuum of ball positions, ball velocity, and ball acceleration data, hole location and gradient information between varying locations, including user location and the hole location and performs a multivariate analysis of all variables captured. The data is, inter alia, conditioned, normalized, optimized and then processed, formatted and made available for storage and display on a mobile device or terminal through an application program, including via a mobile device application.

The invention further is operable to allow correlation of analytics to learning modules or instructional databases, such that it curates or matches instructional resources to users directly based on algorithms accounting for the user's ball data, performance and skill profile of strengths and weaknesses.

The invention is further operable as an entertainment game that enables live comparison of scoring and performance data for multiple users, such as for a golf team of a plurality of players engaging in a practice game; head-to-head competition either live on one device, or virtually across local or wide area wireless or wired networks and simulated game play against professional golf statistics or against a user's historical stat averages.

The invention includes a base unit, or a base unit comprising, a protective housing, an actual or simulated target golf hole, a means for sensing the position and velocity of a golf ball in proximity to said base unit relative to said target, a microprocessor and associated signal conditioning electronics, a computer program being executed by said microprocessor, means for communicating data to and from a standalone interfacing device if applicable (e.g. a network connection, Bluetooth, RTM, Wi-Fi, cellular or other wired or wireless communication channel), and a power source; and a standalone interfacing device (e.g. a personal computer, tablet, smart phone or user equipment or user terminal) comprising a microprocessor, a computer program comprising instructions for being executed by said microprocessor, a means for accepting user input, a means for storing data, a means for communicating data to and from said base unit, a means for displaying information, and a power source; and an analytics engine comprised of software running on a processor for synthesizing and analyzing data from the base unit and mobile application so as to provide the user with actionable suggestions for improving the user's performance. The camera, storage, processing and analysis of the data can occur in a processor in the base unit or in a processor in the mobile device or terminal. Alternatively, the data can be sent via the mobile device or terminal to a "cloud" provider or hosted server on a wide area network for storage, processing and analysis, the analyzed data then formatted for display back at the mobile device or terminal.

Another aspect of the present invention is directed to a system for detecting, tracking, measuring and analyzing putting performance of a golfer. The system includes a pole securable in a golf hole cup and a securing device disposed at a lower end of the pole insertable into a golf hole cup on a putting green, the securing device for engaging an interior surface of the golf hole cup. The system includes a mobile device having at least one camera and viewing screen, the mobile device mounted on an upper portion of the pole for detecting, tracking, measuring and analyzing putted golf balls and associated golfer performance data, the camera directed substantially 90 degrees downward toward the golf hole cup. The at least one camera includes at least one active lens which detects a golf ball as the golf ball enters a field of view of the at least one camera, tracks the golf ball as the golf ball travels along the putting green and stores a path of the golf ball for analysis. The system includes software on the mobile device including algorithm steps which analyze individual performance measurements and provide feedback and instruction based on data captured by the device. The system tracks and records the path and stopping point coordinates of the golf ball in relation to the golf hole cup and the system saves the data and analysis for individual performance. The system analyzes the captured data to formulate assessments of golfer performance and uses the assessments of the golfer performance to provide output to the golfer including analysis both in numerical, graphical and narrative form including the assessments. The system provides suggestions, and tracks and outputs improvements in golfer performance over various time periods. The system may include a second device in communication with the mobile device. The second device may be a second user mobile device and wherein the second user is another player, and the second user mobile device may be exchangeable with the mobile device on the upper portion of the pole. The second device may be a central base station. The second device may be a second user mobile device whereby the mobile device and the second user mobile device are connected to a central base station for gaming. The pole may be a telescoping or folding pole. The system may include a screen shield rotatable from a first position wherein the screen shield covers a screen on the mobile device to a second position wherein the screen shield is away from the screen on the mobile device. The securing device may be expandable for providing a friction fit in the golf hole cup. The system may include a mobile device holder securable to a top portion of the pole, the mobile device holder for positioning the camera toward the golf hole cup, allowing for vector-based tracking, cartesian tracking or radially based tracking and processing. The system may be a gaming platform whereby the mobile device screen simulates a top field view including a golf hole(?) utilizes extended reality programming to enabling users to play competitive games with real balls and equipment, whereby the system automates scoring and game rules during play as opposed to existing methods of human observation; providing visual and audible output in various forms as each game is designed to provide entertainment, including extended reality. The output may include scoring, statistics, trends, comparative analysis, instruction, drills, resources, equipment suggestions and content.

Another aspect of the present invention is directed to a system for detecting, tracking, measuring and analyzing putting performance of a golfer. The system includes a pole securable in a golf hole cup and a securing device disposed at a lower end of the pole insertable into a golf hole cup, the securing device for engaging an interior surface of the golf hole cup. The system includes a capturing device including a camera, the capturing device mounted on an upper portion of the pole for detecting, tracking, measuring and analyzing putted golf balls and associated golfer performance data, the camera directed substantially 90 degrees downward toward the golf hole, wherein the camera includes at least one active lens which detects a golf ball as the golf ball enters the camera field of view. The system includes software on the mobile device having steps which analyze individual performance measurements and provide feedback and instruction based on data captured by the device. The capturing device tracks the golf ball as the golf ball travels along the putting green and stores the path of the golf ball for analysis. The system saves the data and analysis for individual performance. The system analyzes the captured data to formulate assessments of the golfer performance and uses the assessments to provide output to the user including analysis both in numerical and graphical form including the assessments. The system provides suggestions and tracks and outputs improvements in a golfer performance over various time periods. The capturing device may be a mobile device. The system may include a second device in communication with the mobile device. The second device may be a second user mobile device and wherein the second user is another player, and the second user mobile device may be exchangeable with the mobile device on the upper portion of the pole. The second device may be a central base station. The second device may be a second user mobile device whereby the mobile device and the second user mobile device are connected to a central base station for gaming.

Another aspect of the present invention is directed to a gaming platform for golf, the gaming platform including a pole securable above a golf hole cup and a capturing device including a camera and viewing screen, the capturing device mounted on an upper portion of the pole for detecting, tracking, measuring and analyzing putted golf balls and associated golfer performance data, the camera directed substantially 90 degrees downward toward the golf hole. The camera includes at least one active lens which detects a golf ball as the golf ball enters the camera field of view, tracks the golf ball as the golf ball travels along the putting green and stores the path of the golf ball for analysis. The capturing device includes software having steps which analyze individual performance measurements captured by the capturing device. The system saves the data and analysis for individual performance. The system uses the path of a golf ball in the analysis. The system analyzes the captured data to provide competitive statistics of users of the gaming platform. The mobile device screen simulates a top field view including a golf hole, enabling users to play competitive games, including live over a wireless communication system, against themselves, against the app, or against other players. The capturing device may be a mobile device.

Another aspect of the present invention includes a method for using the system. The method includes ensuring the pole is secured in the golf hole cup, ensuring the mobile device is secured on the upper portion of the pole, the camera directed substantially 90 degrees downward toward the golf hole cup and activating the software on the mobile device. The method includes the golfer hitting the golf ball on the putting green. The system tracking and recording path and stopping point coordinates of the golf ball in relation the golf hole cup. The method includes the system saving the data and analysis for individual performance and the system analyzing the captured data to formulate assessments of golfer performance and uses the assessments of the golfer performance to provide output to the golfer including analysis both in numerical, graphical and narrative form including the assessments. The method includes the system providing suggestions, and tracking and outputting improvements in golfer performance over various time periods.

The putting green as discussed in this application may be an outdoor putting green, an indoor putting green or a movable putting green. The putting green may be artificial turf or real grass. The putting green may be any putting surface which allows a golfer to putt golf balls.

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 5 is an illustration explaining data analysis and the practical value of analyzing an increasing number (1, 2, 3) of variables used in the analysis engine, the data correlated to the tables of FIGS. 6A to 6F;

FIGS. 6A to 6F are tables with example data and results outputted by the invention, specifically a subset of statistical data for putts missed short, short-left, and short-right;

FIG. 8B is a table with example data and results showing a subset of statistical data for putts recorded for a right-to-left slope following the flow chart of FIG. 8A.

Figure 1:
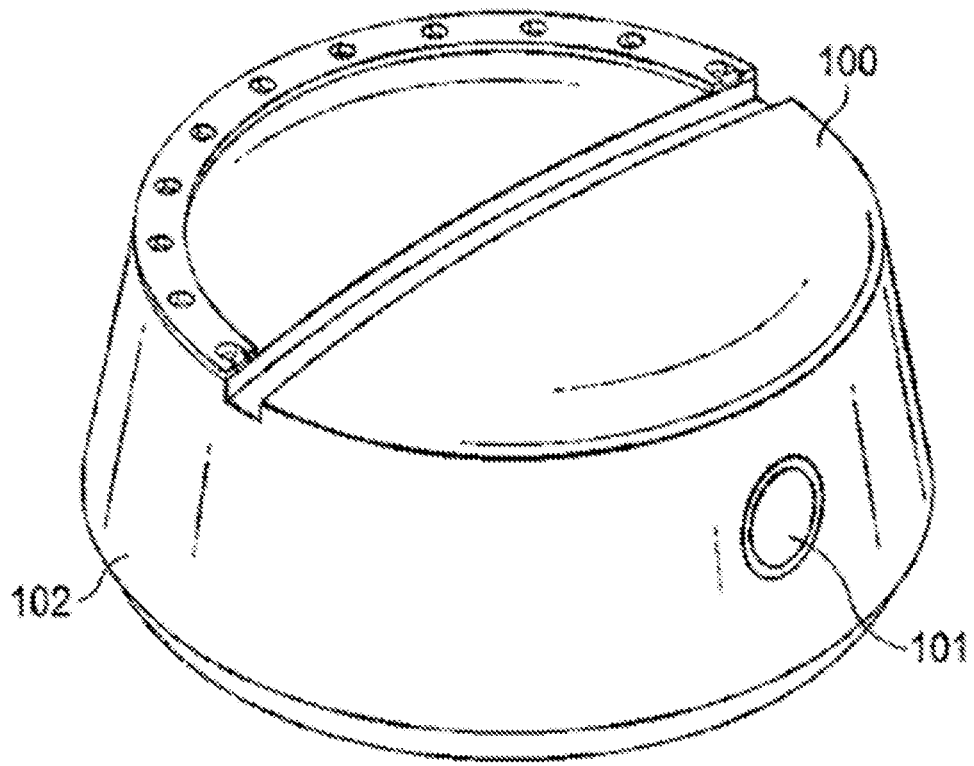
FIG. 1 is an illustration of a first form factor of a base unit used in the invention.

In some embodiments the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

DESCRIPTION OF THE PREFERRED EMBODIMENT(S)

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

While the making and using of the disclosed embodiments of the present invention is discussed in detail below, it should be appreciated that the present invention provides many applicable inventive concepts which can be embodied in a wide variety of contexts. Some features of the preferred embodiments shown and discussed may be simplified or exaggerated for illustrating the principles of the invention.

Form Factors and Functionalities of the Invention

The invention, as more fully described herein, is a golf instruction apparatus and analytics platform embodied in one of a base unit alone, a base unit having certain functionalities in combination with a mobile device or terminal, a base unit having certain functionalities in combination with modules in a remote server; a base unit having certain functionalities in combination with modules in a mobile device or terminal and a remote server, a mobile device or terminal alone; or a mobile device or terminal having certain functionalities in combination with modules in a remote server.

Figure 2:
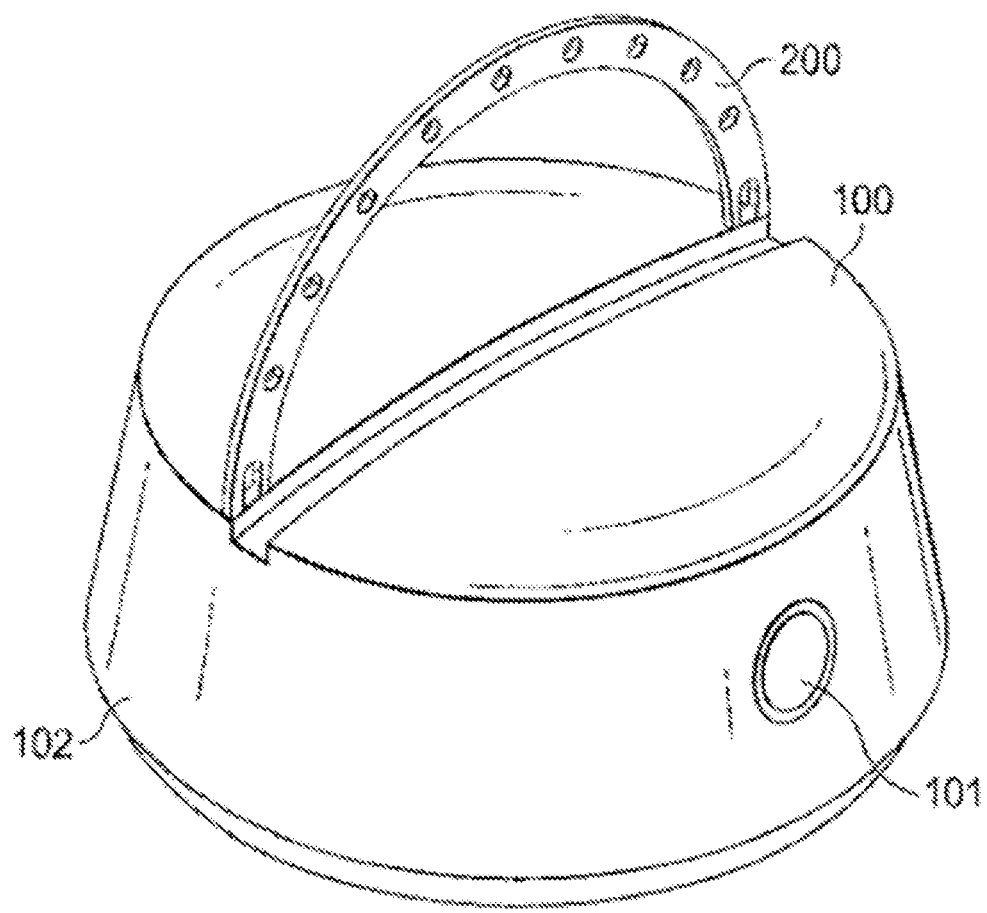
FIG. 2 is an additional view of the form factor of a base unit of FIG. 1.
Figure 3:
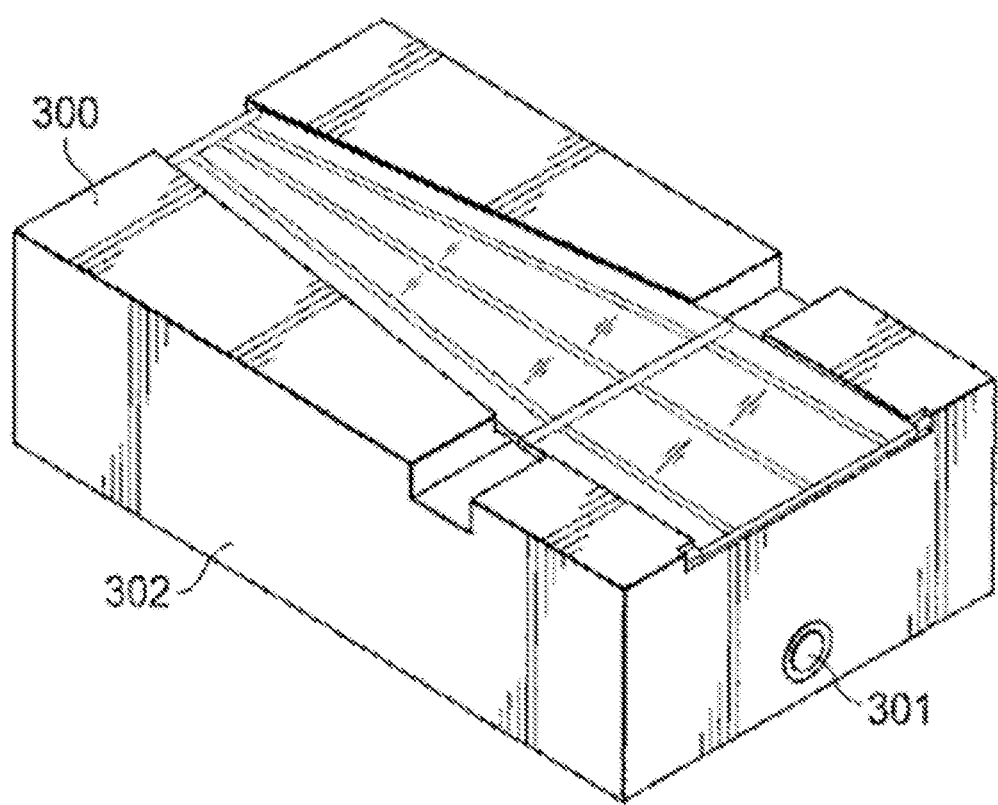
FIG. 3 is a second illustration of a form factor of a base unit used in the invention.

In certain such combinations above, the base unit housing comprises a form factor, two examples of which are seen in FIGS. 1-2 and 3-4 respectively. Referring to FIGS. 1 and 3 respectively, the base unit 100, 300 incorporates an optical sensing means 101, 301, a microprocessor and a wired or wireless transceiver. The interfacing device to the base unit 100, 300 is preferably a mobile device or terminal such as a smart phone, running an associated computer program.

The base unit 100 comprises a housing unit 102 being made of a rigid material, preferably a hard plastic such as polyvinyl chloride. Within the housing unit is a base unit microprocessor (S-MPC) running camera driver firmware, means for remotely communicating video data to and from a standalone interfacing device, and an infrared or optical sensing means such as a camera or recording video for playback in mobile application, and a power source or sources (e.g., a battery).

Figure 4:
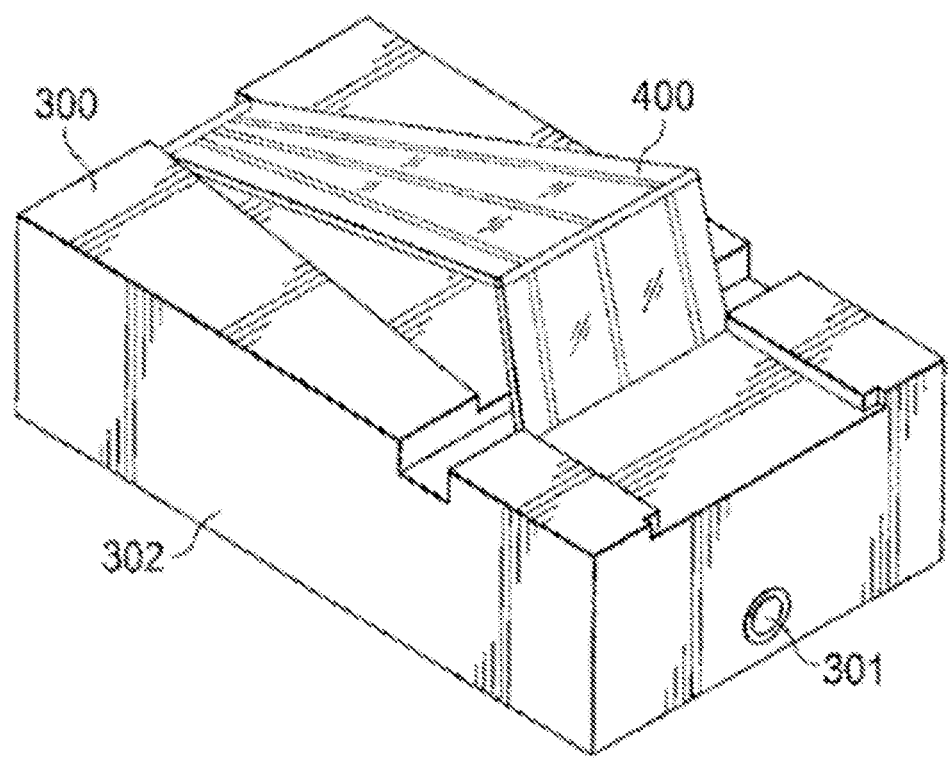
FIG. 4 is an additional view of the form factor of a base unit of FIG. 3.

The base unit 100, 300 incorporates an optical sensing means 101, 301, a microprocessor and a wired or wireless transceiver. The interfacing device to the base unit 100, 300 is preferably a mobile device or terminal such as a smart phone, running an associated computer program. As seen in FIG. 2, a retractable support 200 is provided for holding a mobile device or terminal that interfaces to the base unit. As seen in FIG. 4, a folding support 400 is provided for supporting a mobile device or terminal that interfaces with the base unit. In other embodiments, all functionalities of the invention are included in a mobile device or terminal and the base unit is a passive platform for supporting the mobile device or terminal.

The invention further comprises a mobile application running on a mobile device or terminal, such as a smartphone, the mobile device or terminal comprising a device microprocessor (D-MPC), a device computer program being executed by said D-MPC, a means for accepting user input, a means for storing data, a means for communicating video data to and from said base unit (e.g. a wired or wireless network connection, Bluetooth, RTM, cellular or other wired or wireless communication channel), a means for displaying information including results of the putt and the video playback, and a power source(s). The device computer program comprises instructions being stored on a computer readable medium to be executed by a microprocessor to perform the following functions: querying for and accepting user input (e.g., putt length, planned number of shots in current session), communicating with the D-MPC in said base unit to trigger certain events, manipulating video data, and formatting said video data for output via said means for displaying information.

In an embodiment, said means for sensing positioning and velocity of a putted golf ball in close proximity to user-facing side of said housing comprises one or more remote motion detectors, e.g., an optical sensor such as a passive infrared detector or video camera, or an active radiating sensor such as an ultrasonic motion detector or a microwave motion detector. In one aspect of the invention, the camera on a mobile device or terminal, such as a smart phone, is used to capture the video, the camera being positioned on the base unit and in another aspect of the invention, the camera is integrated into the base unit and the video is communicated to from the base unit, along with sensor data, to the mobile device or terminal.

In a further embodiment, said means for sensing positioning and velocity of a putted golf ball in close proximity to user-facing side of said housing comprises 3 remote motion detectors in the base unit located to the left, right, and rear respectively of a simulated golf hole. The invention further comprises a display for displaying the output results.

The golf instruction apparatus and analytics platform can include a base unit coupled to a mobile device or terminal over a wired or WIFI. Bluetooth, RTM, cellular or similar radio spectrum link. The base unit further comprises a housing being made of a rigid material, preferably a hard plastic such as polyvinyl chloride, a sensing circuit for sensing position and velocity of a putted golf ball in close proximity to a user-facing side of said housing, a microprocessor running base unit firmware for driving camera input/output (I/O), a signal conditioning circuit for conditioning sensor data such that it is readable by said microprocessor, a transceiver for remotely communicating video data to a mobile terminal or device, a recording module for video recording user's putting stroke from the vantage point of simulated target hole; and a power source.

Analytics Engine

The invention includes an analytics engine as more fully described below. As used herein, "multivariate" generally means the use, analysis and correlation of 2 or more different data points in combination. "Multivariate putting performance data and analysis" means the numerical and mathematical measures of a golf ball putted towards a golf hole or simulated target, so that any combination of variables collected may be cross analyzed with any others to provide more granular feedback on specific skill areas needing improvement. For example, multivariate analysis may determine a user's worst performance skill segment is "when putting from 6' from target with Left to Right slope, user misses right 70% and short 83%." Contrast this with a single variable that shows a user on average "misses right 70%" over all putts recorded. The more meaningful and accurate feedback is the multivariate analysis because in that example, the Left to Right slope variable imparts an otherwise non-obvious influence on putting performance since more balls on right sloping terrain that are putted short (83%) will fall right of the hole due to gravity. So, the multivariate analysis points to the high miss percentage most likely being a speed/distance issue since 83% were short of the target. But if only the single variable were reviewed, in this case (70% right misses), it can mislead the user about the cause of the missed putts—for example that perhaps they are pushing the ball right.

The analytics engine of the invention includes application software executed by at least one processor that enables the analysis of both individual data points and multivariate analysis of any number of variables. Such data analysis provides broader and more practical feedback since there are inherent interdependencies and influences across each of the different variables. The breadth of the invention's analysis operations can be best understood this way: there are at least 3 primary categories of variables for "made" putts, and at least 8 for "missed" putts, with over 70 total subcategories. This enables thousands of combinations of multivariate analysis of factual ball-related performance data.

The analytics engine of the invention collects video data either in-device or via customized mobile phone camera/software and integrates it with aggregate user performance data and performs a multivariate analysis thereof so as to provide actionable feedback to a user. More specifically, the invention is a method and apparatus employing video capture to record users putting stroke and determine the state of a putted golf ball relative to a target, and remotely displaying the same comprising a camera(s), base unit, a standalone interfacing device, and an associated computer program.

In an embodiment, the golf instruction apparatus and analytics platform invention herein comprises a base unit or mobile device or terminal operable to receive stimuli related to the state of a golf ball, a processor coupled to the base unit operable to digitize said stimuli into input data; and an analytics engine comprising software in the form of computer instructions stored on a computer readable medium and executed by a processor, the analytics engine operable to (i) correlate the input data with at least one external variable, (ii) using an algorithm, process the correlated input data and at least one external variable to obtain a result and (iii) output the result.

The invention further includes a data analytics engine that comprises software in the form of instructions to be executed by a processor. The invention, in the form of a system comprising the base unit, including at least one camera and/or sensor, and the mobile application executable on a mobile device or terminal, is operable to capture, aggregate, analyze, and then correlate a user's actual skill proficiency and ball performance during use. The invention is operable to capture video data from the base unit or mobile device or terminal, save the data in a local memory unit therein or in a central server via a network connection, the data segregated by user for individual user access and analyze user data to provide the user practical information.

Referring now to FIG. 5 and FIGS. 6A to 6F, an example of how data is useful for self-guided instruction. Referring to FIG. 5, a single variable analysis 501 shows percentages based on the number of putts taken and made and number of putts taken and missed. The percentages correlate to cells 605 and 606 in FIG. 6D.

A two variable analysis 502 shows percentages based on the number of putts taken and missed left side versus number of putts taken and missed right side. The percentages correlate to cells 607 and 608 in FIG. 6D.

A two variable analysis 503 shows percentages based on the number of putts taken and missed short versus number of putts taken and missed long. The percentages correlate to cells 610 in FIG. 6E, and 612 in FIG. 6F.

A three plus variable analysis 504 shows percentages based on the number of putts taken and missed short and left. The percentage correlates to cell 611 in FIG. 6E.

A three plus variable analysis 505 shows percentages based on the number of putts missed left and short for left-to-right sloping attempts. The percentage correlates to cell 604 in FIG. 6B.

A three plus variable analysis 506 shows percentages based on the number of putts missed left and short for left-to-right sloping attempts at 2-4 feet, for example, from target or hole. The percentage correlates to cell 602 in FIG. 6B.

A three plus variable analysis 507 shows percentages based on the number of putts missed left and short for left-to-right sloping attempts at 2-4 feet in the most recent 30 days.

FIG. 5 further demonstrates how the multivariate analysis provides practical value to the user in the form of feedback

508. In this example, the data from FIG. 6D (609), FIG. 6A (601) and FIG. 6B (603) is fed into the analysis The location of a missed putt is determined by orientation to the hole by coordinates wherein the coordinates are Cartesian, polar, or some other coordinate system that plots the ball's location in proximity to the target. Statistical percentages can also be provided based on the user's proficiency with "2-putting", defined as putting the ball in the hole on the next (or $2^{nd}$) putt attempt immediately after a missed putt.

Permutations of all of the above, further modified by the length of the putt, timespan of practice (i.e., last 30 days, last 120 days), gradient of slope between the beginning of the putt and the hole (e.g., level, left-to-right (LR), or right-to-left (RL)). Each set of variables related to a putt is referred to as a putt context. Similar putting contexts can be grouped and analyzed together by the analysis engine.

The analysis engine is operable to calculate a user's lowest performance segments or contexts as focus areas for practice. The analysis engine is further operable to provide trend data for each data class or context. For example, trend data may show that a user's putts made from less than 10 feet improved from 43 percent to 45 percent over last 90 days and 1,373 attempts.

Machine Learning Module

A further embodiment of the invention incorporates a machine learning module. The stimuli (referred to as a "feature" in machine learning as described herein) is at least one selected from the group consisting of location of the golf ball relative to a start position and an actual or virtual target or target hole, speed, velocity, acceleration and deceleration of the golf ball over a selected length of travel, golf ball force at any time prior to, and upon impacting or reaching the actual or virtual target or target hole, spin of the golf ball at any time prior to, and upon reaching or impacting the actual or virtual target or target hole and lift of the golf ball off a club face. The at least one external variable (also a "feature") is one selected from the group consisting of user position, user motion, club position, club motion, actual or virtual target location, actual or virtual target hole location, gradient between selected locations, wind velocity, wind acceleration, characteristics of a putting surface, including attributed speed based on the measurement of static and dynamic co-efficient of friction and obstacles. At least one of the at least one external variables are previously stored in a memory accessible by the processor. Alternatively, or in addition, at least one of the at least one external variables are sensed, collected and stored in a memory accessible by the processor contemporaneously with the receipt of stimuli related to the state of the golf ball. The external variables comprise spatial orientation of ball relative to a target, speed and velocity of the ball, when impacting target compared to an acceptable speed range, spin of the ball, lift of the ball off club face, and a visual representation of the putting stroke.

According to Wikipedia, machine learning uses statistical techniques to give computer systems the ability to "learn" (i.e., progressively improve performance on a specific task) with data, without being explicitly programmed. Machine learning is closely related to (and often overlaps with) computational statistics, which also focuses on prediction-making through the use of computers. It has strong ties to mathematical optimization, which delivers methods, theory and application domains to the field. Within the field of data analytics, machine learning is a method used to devise complex models and algorithms that lend themselves to prediction; in commercial use, this is known as predictive analytics. These analytical models allow researchers, data scientists, engineers, and analysts to "produce reliable, repeatable decisions and results" and uncover "hidden insights" through learning from historical relationships and trends in the data.

An algorithm which can be used with the invention to improve its performance and user suggestions is Tensor-Flow, a machine learning open-source application. Using a neural network algorithm, over time the invention builds data sets of stimuli related to the state of a golf ball and external variables that act upon the golf ball and maps them to the final result of the golf ball. The data sets are thus training data sets that are improved each time a user uses the invention.

The data sets are stored as tabular data formatted as comma-separated values (CSV). The first line of a CSV is a header containing information about the dataset, including features, which are float numbers to hold information about the stimuli and the external variables and a label, which is a final outcome, result, prediction or suggestions. These data sets are parsed and combined to provide a single tensor, which is the label, using a model coded in Python. A model is the relationship between "features" and the "label". Traditional programming techniques (for example, many conditional statements) can be used to create a model. However, this requires an analysis of datasets over a long period of time to determine the relationships between golf ball measurements, external variables and the final result. The machine learning approach of this invention determines the model. Neural networks can find complex relationships between features and the label. It is a highly structured graph, organized into one or more hidden layers.

Each hidden layer consists of one or more neurons. There are several categories of neural networks, and an embodiment of the invention uses a dense, or fully connected neural network: the neurons in one layer receive input connections from every neuron in the previous layer. When the model is trained and then receives stimuli and external variables data, it yields predictions and suggestions to the user.

Training is the stage of machine learning when the model is gradually optimized, or the model learns the dataset. The invention learns enough about the structure of the training dataset to make predictions about unseen data. The invention can implement either supervised machine learning where the model is trained from examples that contain labels or unsupervised machine learning where the examples do not contain labels. Instead, the model typically finds patterns among the features (stimuli and external factors).

The invention uses a training loop to feed dataset examples into the model to help it make better predictions. Using TensorFlow, the invention implements a code block to set up the training steps:
  (1) Iterate each epoch. An epoch is one pass through the dataset.
  (2) Within an epoch, iterate over each example in the training Dataset grabbing its features (x) and label (y).
  (3) Using the example's features, make a prediction and compare it with the label. Measure the inaccuracy of the prediction and use that to calculate the model's loss and gradients.
  (4) Use an optimizer to update the model's variables.
  (5) Keep track of statistics for visualization.
  (6) Repeat for each epoch.

Over time, the invention is trained so that when it receives certain combinations of stimuli related to the state of a golf ball and external variables, it provides a certain output or result comprising user performance.

The output result of the machine learning module comprises a user's putting performance relating to user and club alignment, user and club position, stroke technique, muscle memory and distance control (each being a "label") as further described herein.

Image Capture. Processing and Analysis Referring to FIG. 8A, the platform (base unit and/or mobile device or terminal) is powered on 801, receives user preference inputs 802, mode inputs 803, such as practice mode 804 If game mode 805 is selected, user selections 806 are prompted related to the date, putting length, number of putts and putting green slope. These are stored in the database 813. Once a put 807 is made, the platform receives video data 808.

In one aspect of the invention, the camera on a mobile device or terminal, such as a smart phone, is used to capture the video data 808, the camera being positioned on the base unit and in another aspect of the invention, the camera is integrated into the base unit and the video 808 is communicated from the base unit, along with sensor data, to the mobile device or terminal.

Another embodiment utilizes a mobile device alone without a separate base unit, and such mobile device is placed in a stand or platform so as to both capture, process and analyze video data with statistical data in the multivariate analysis, or to capture, partially process and communicate data to the cloud (a distributed or remote processor or server networked to the mobile device or terminal), whereupon such data is further processed and made available (pushed or pulled) to the user locally or remotely. In this example embodiment, the video data is used to determine which putts are made 809 and which are missed left 810A, and of those, which are short 811A and long 811B and those which are missed right 810B, and of those, which are short 812A and which are long 812B.

The components of the invention include several video aspects. In one aspect, an unaided video camera records the user's putting stroke for subjective self-assessment by user or sharing externally through any conventional means of communication such as email, text, and social media. Video review is available in real-time and without tethered/coupled motion capture elements either on the putter or user, sensor data, other inputs, or in-device validations.

A further video aspect of the invention comprises image/motion capture. This aspect measures factual user performance of the putted golf ball in relation to a target during use; records result and metrics such as ball accuracy, path, spin, lift, speed, spatial orientation. None of above metrics are necessarily based on calculated or predicted outcomes nor based on any sensor-based measures of equipment or user motion. Video analysis and/or image processing is used to determine metrics and analyze actual ball data from which to draw meaningful conclusions that a user can use to improve putting skills.

A further video aspect of the invention is the ability to auto-trim video using camera 701. In this aspect, a video recording start 702 is initiated by either a recognized vocal/audible cue 711, visual motion detection within the frame of the camera 710, vibration, or mechanical trigger. The length of the video to be saved is automatically edited by starting 703 and stopping 704 to cover the cue plus 5 to 8 seconds, depending on the length of the putt input by the user.

Figure 8A:
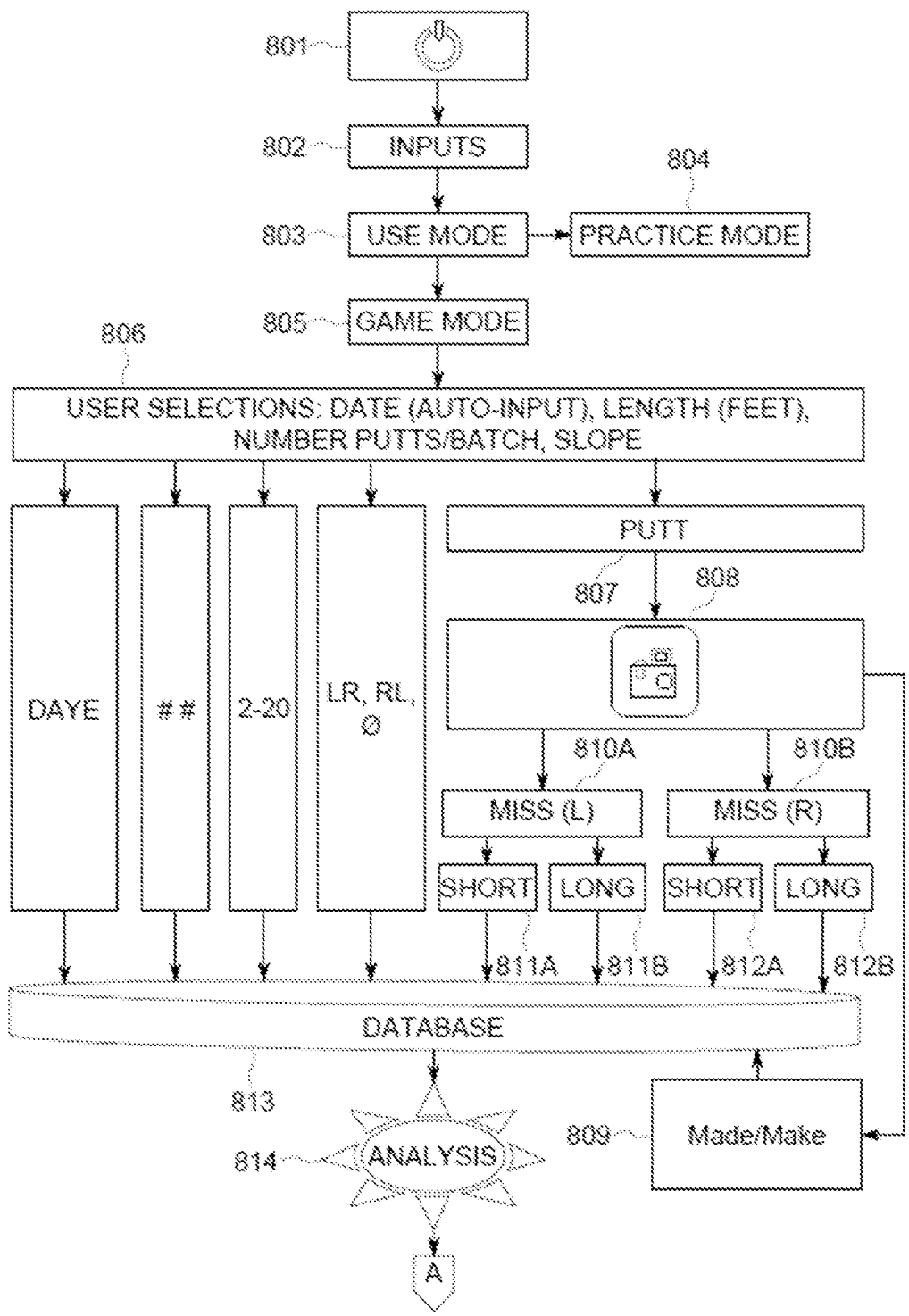
FIG. 8A is a flow chart of the steps of the invention showing the ball results based on the unaided video as informed by an analysis by the analytics engine.

As noted in FIG. 8A, prior to starting a batch of putts, a user inputs the length, slope and number of putts in the batch they desire to take, shown as step 806. Predetermined time periods are then coded into a processor such that at shorter putt lengths, the video clips will be shorter than longer lengths to capture the full period of interest while avoiding the recording of an excessive amount of video data. For example, a user that inputs a batch of 3-foot putts might require video lengths of cue plus 3 seconds, whereas a batch of 15-foot putts might require video lengths of cue plus 6 seconds. The invention performs video trimming using triggering method(s) for start-recording 702 and stop-recording 704. In contrast, conventional techniques use other data, such as non-audio, and then correlate it with audio data to confirm an event, whereas the invention initially recognizes the prospective event using the above audio or other triggers.

Further, the invention uses video clips only for subjective self-analysis and "tagged" to allow the user to review strokes based on an understanding of the data. For example, assume a user performs 20 putts of which the user makes 14 and misses 6, 5 of which are left misses. The user may wish to review the 5 left miss video clips to observe issues that caused the misses to inform what aspects are in need of correction. To do this, the videos are simply tagged with the related result, "made" "missed left" The invention does not formulate comparison data, rather it uniquely captures outcome data that is analyzed as seen in steps 706, 707, 708 and 814 by the analytics engine for immediate performance feedback as seen in FIGS. 5, 6A-6F, and long-term trending statistics that demonstrate the true impact of the training device. This is in contrast to conventional systems which use data and video to compare a trajectory referenced against digital markers to the desired trajectory.

Figure 7:
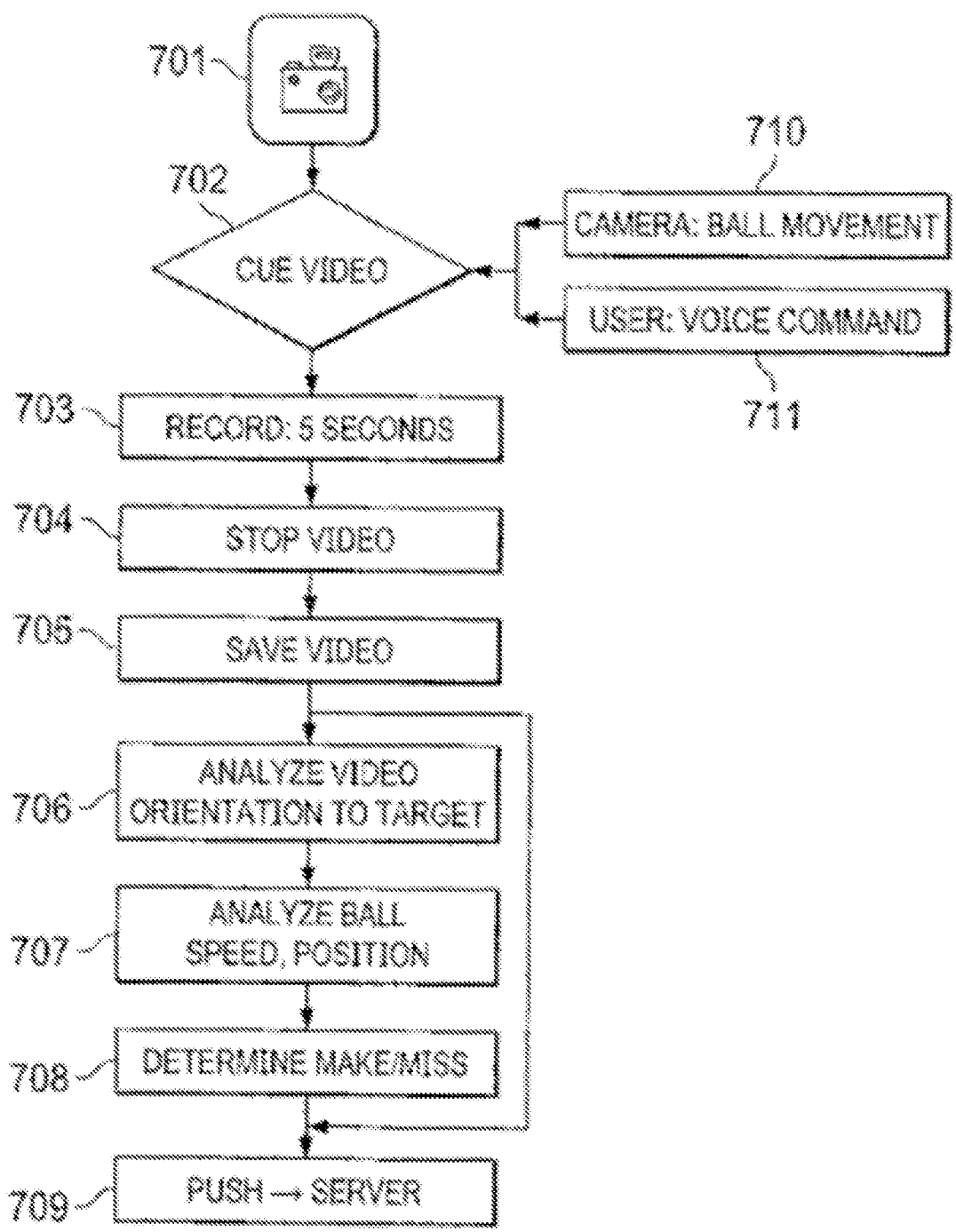
FIG. 7 is a flow chart of the general steps of the invention producing the ball results.

The invention, in operation, is as follows according to an embodiment seen in FIGS. 7 and 8A-8B: The user putts 807 standard, non-sensor golf ball towards a golf hole or simulated golf hole target. The base unit or mobile device or terminal is positioned such that the target is in the front thereof, in the anticipated path of the golf ball (behind the target or hole). The base unit (on which a mobile device or terminal can be temporarily integrated) or the mobile device or terminal alone, detects motion (702, 710 or 711) and initiates the video recording 703 of user's stroke, as well as registers various aspects related to, among other things, the path, speed and ending location of the ball in proximity to the target. The target can be represented by an actual or virtual hole or marker. The video recording whether from a camera in the base unit or standalone mobile device or terminal, may be motion-activated by the video camera or by the user remotely using sound or vibration sensors, other sensor types, a detachable mechanical switch, or verbal command. In one aspect of the invention, the camera on a mobile device or terminal, such as a smart phone, is used to capture the video, the camera being positioned on the base unit or independent stand, and in another aspect of the invention, the camera is integrated into the base unit and the video is communicated to from the base unit, along with sensor data, to the mobile device or terminal or in some aspects, directly to the cloud via a Wi-Fi or cellular link.

The invention is operable to store results of user putts in batches, the quantity chosen by the user before each use. So, all putts taken in a batch are stored, analyzed and displayed to the user on the mobile device or terminal in near-real time. For example, as seen in FIG. 8B (815) for a batch of 50 putts, a user makes 45 and misses 5, 2 of which are missed left and 3 right. The mobile device or terminal would then display (816) the percentages of those Made, Missed; Missed Right, and Missed Left.

The invention then aggregates factual data and then calculates the user's actual performance. Data is captured locally based on the actual movement of the ball and is not extrapolated by a) utilizing a remote database of archived reference data, or b) predictive calculation based on stroke technique or characteristics other than those related directly to the ball.

The analytics engine of the invention is further operable to correlate performance results to instructional resources to provide curated instructional resources to user for purchase and compare user performance data against professional golf putting statistics.

The invention provides actionable feedback to the user to enable self-diagnosis and device-generated guidance on areas of practice by providing actual performance data along with video footage of stroke at ground level to observe set up or stroke flaws.

In addition to being a training system and platform, the invention is also an entertainment platform as it is operable to permit multiple players to compete against each other either in alternating player format or virtually across the internet using network connectivity. The invention is further operable as a standalone, unaided video analysis system.

The invention provides results based on ball movement, regardless of the stroke or swing used. As a result, the invention provides user feedback that is based on performance whereas conventional training systems provide feedback based on technique. Hence, a user with an incorrect stroke will benefit from the invention's accurate measurement of factual results. In contrast, conventional systems incorporate sensor data and video to provide feedback to the user specific to aspects of their technique even if improper technique may provide better actual performance results for the user. The invention does not provide data related to appropriate or desired techniques for using equipment. The invention is further differentiable from conventional systems in that the input and output to the invention is based on image and data capture of actual ball movement after being engaged by the user whereas conventional systems use calculated or other predictive methods based on sensors attached to equipment or user.

The invention further incorporates an analytics engine operable to perform multivariate analysis of actual performance results for instructional purposes, whereas conventional systems provide predictive analysis of stroke characteristics. In contrast, the invention compares actual putting performance against the actual putting performance of professional golfers' average putting performance, without regard for technical data comparison.

The invention does not require any visual markers, sensors, other aids or objects on the equipment or user to recognize and process video to record the ball or user. Video is taken from the vantage point of the base unit or standalone mobile device facing toward user.

The recording is transferred from the base unit over a wireless protocol such as Wi-Fi or Bluetooth to the mobile device or terminal and is accessed 816 at the mobile device or terminal via a mobile application.

The invention is operable to transmit data over a wired or wireless network to the cloud comprising public and/or private server(s), and all historical performance data and video data is accessible from such server(s) in the mobile application via the mobile device or terminal. In an aspect of the invention, the user can log into the mobile application to review their performance statistics, analysis, and compare such statistics against the average statistics of professional golfers. The invention is further operable to communicate data to the mobile application via the Bluetooth wireless protocol, the Wi-Fi protocol or by plugging the mobile device or terminal using a USB cord into a computer that communicates to the network. In operation, a user can review the video on their mobile application to determine issues in set-up or stroke. By using the personal statistics and the video review, users can identify which corrections are needed to improve putting performance.

The invention provides the following advantages. It is operable as a factual assessment tool that reflects putting skill performance based on actual results of putting a ball in relation to a target; it is operable as a game that can be played by multiple players against each other either in alternating player format or virtually across the internet assuming players have connectivity. The video component enables visual self-learning of stroke and ball characteristics. The longitudinal data analysis enables device-driven learning and curated instructional feedback. The use of analytics by the invention is operable to generate and serve alerts to the user of the primary areas where practice is required. The invention enhances the user experience compared to conventional systems that only allow user to see success on a stroke-by-stroke basis. The application embodied in the invention can include different levels of instruction as the user reaches skill plateau and the invention provides 24/7 access via the mobile application to video and performance data.

A method and apparatus in accordance with the present invention for determining the state of a putted golf ball relative to a target and remotely displaying the same generally comprises a base unit and a standalone interfacing device and an analysis engine operable to provide actionable feedback to the user.

In an embodiment, at least one of the input data, external variables, machine learning algorithm and output are transmitted and stored in a remote or distributed server. In a further embodiment, the input data, external variables, algorithm and output are collected, transmitted and stored in a remote or distributed server and machine learning and artificial intelligence techniques are applied thereto to provide insights into the user's past, current and predicted performance.

The data generated and stored by the firmware and device computer program are maintained to be acted upon by analytics programs to enable factual conclusions to be drawn about the user putting skills, both historically as compared to the user's prior putts (all or a subset thereof) and as compared to putts made by others, such as by professional golfers.

In an embodiment, said means for sensing position and velocity of a putted golf ball in close proximity to user-facing side of said base unit housing comprises one or more optical sensors.

The analytics engine of the invention is further operable with a virtual reality headset. In such embodiment, the only physical device may be a sensor handle that mimics a putter or golf club. An extension to the golf head, the golf ball, the target hole and the putting green are all or a portion thereof, are virtual. The firmware and device computer program are configured to execute algorithms to detect the velocity of the virtual ball to make a determination if the virtual golf ball would have entered a virtual target hole. If it determines that a golf ball had too much velocity, it can further determine how far past the virtual target hole the virtual golf ball progressed. Further, the user can input virtual parameters into the platform, such as the elevation of the hole, obstacles between the user and the hole and wind speed and direction and take such factors into account when determining if the golf ball went into or to the left or right of the hole.

The problem solved is a device and technology able to detect, track, measure and analyze putted golf balls and associated golfer performance data in the golf skill called putting.

With a custom camera system and/or custom software accessing a mobile device camera from a position directly over top (camera looking straight down from 90* to ground) a real or simulated golf hole, the device detects and tracks putted golf balls to their stopping point. Both datapoints for the ball's path and eventual endpoint are captured, saved and analyzed as various individual performance measures and in aggregate for various longitudinal measures of performance, among other things. From this data or analysis, the invention provides various types of curated feedback and instruction (based on their performance data) that helps them improve their putting skills. Further, the invention enables users to play competitive games, including live over bluetooth/wifi, against themselves, against the app, or against other players also using the invention.

Unique features include, among other things, use of computer vision to detect and track golf balls; a system that captures exclusive data from detected/tracked balls; a system that analyzes such data to formulate assessments of human golfers' performance competency; and a system that uses such competency assessments to provide output to the user in the form of trends, engagement figures, and optimal skill improvement plans, among dozens of other data-driven feedback.

With a custom camera system and/or custom software accessing a mobile device camera from a position directly over top (camera looking straight down from 90* to ground) a real or simulated golf hole, the device detects and tracks putted golf balls to their stopping point.

Datapoints for the ball's path and eventual endpoint are captured, saved and analyzed as various individual performance measures and in aggregate for various longitudinal measures of performance, among other things.

From this data or analysis, the invention provides various types of curated feedback and instruction (based on their performance data) that helps them improve their putting skills. Further, the invention enables users to play competitive games, including live over bluetooth/wifi, against themselves, against the app, or against other players also using the invention.

The invention helps golfers 1) learn about their factual skill level across a range of different areas, 2) get guided practice plans based on skill level determined, 3) have more fun as it provides a platform to play games that also improve skill and are more fun than traditional practice.

Users place the camera holder (pole) into the golf hole or simulated hole. If using a mobile device, position mobile device in the holder at top of the pole, then start using the mobile app. Once started, user hits golf balls towards the target hole or simulated hole. The invention does scorekeeping and all data collection, which the user can view in the application.

Method & positioning of invention for detecting/tracking balls along the ground; exclusive system for detection/tracking/analysis/categorization of performance and subsequent output of training/instructional feedback provided; automating scoring as opposed to existing method by human observation; real-time multiplayer putting games, using real golf balls in augmented reality.

A—mobile device held in position on phone holder pole
    B—custom camera system in custom housing on custom pole
    C—custom camera system in custom housing retrofit to golf flags on course
    D—custom camera system in drone or otherwise positioned on TV camera towers.

Another aspect of the invention shown in FIGS. 9-23 is a system 900 which includes a custom camera 902 and viewing screen 904, either on the custom camera 902 or separately on mobile app or other viewing device or screen, and associated software which is mounted on the top of a telescoping pole 906 for detecting, tracking, measuring and analyzing putted golf balls 990 and associated golfer performance data in putting. The camera 902 is directed straight downward at a 90-degree angle toward the golf hole 992. The telescoping pole 906 includes securing devices 910 disposed at the lower end of the pole. The securing device 910 may be a male cylindrical plug inserted into the golf hole cup 994 and may expand for engaging the interior surface of the cup. The securing device 910 may alternately be a detachably affixed spike that protrudes through the center hole in the cup and into the ground for indoor or outdoor use. The camera 902 is either a custom embedded camera system on chip (SOC) with a single or multiple cameras or a mobile device having at least one active lens, any of which detects any golf ball as it enters the camera field of view, tracks and stores the path of the golf ball and the stopping point and for analysis. The system 900 is able to measure speed of the golf ball 990, the path, as well as the stopping point, distance and proximity (360-degree coordinates) of the golf ball 990 in relation to the target hole 992, among other inputs and data points that are saved and analyzed to determine and categorize individual performance. The system 900 and related software captures, saves and analyzes individual performance measures and generates feedback and instruction based on algorithms related to the raw data and analysis. The system 900 aids in improving putting skills of the user. The system 900 analyzes the captured data to formulate assessments of human golfers' performance and uses the calculated performance competency assessments to provide output to the user, including analysis both in numerical and graphical form directed to any of the devices or another external device. This output may include the assessments, practice drill suggestions, strategy and mindset guidance, as well as tracking trending and progress-to-goals among other output related to each golfers' performance over various time periods. Various apparatus features include a rotatable sun shield 912 and mounting system 914 for the mobile device 901. Additionally, the system 900 can access sensors on the user that enable system to follow the user position for using the system. Additionally, the system may be a gaming platform whereby the mobile device screen 904 simulates a top field view including a golf hole 992, enabling users to play competitive games, including live over a wireless communication system, against themselves, against the app, or against other players also using the invention. The system will employ artificial intelligence that takes player data into account to challenge them with games and drills with matching levels of difficulty.

Security measures may be provided in the system by using or requiring the IP address and/or GPS information of the mobile device 901 in wireless communication with the secondary wireless device. Other wireless information such as that used in Bluetooth, ZigBee or similar wireless format may be utilized in providing additional security.

Figure 20:
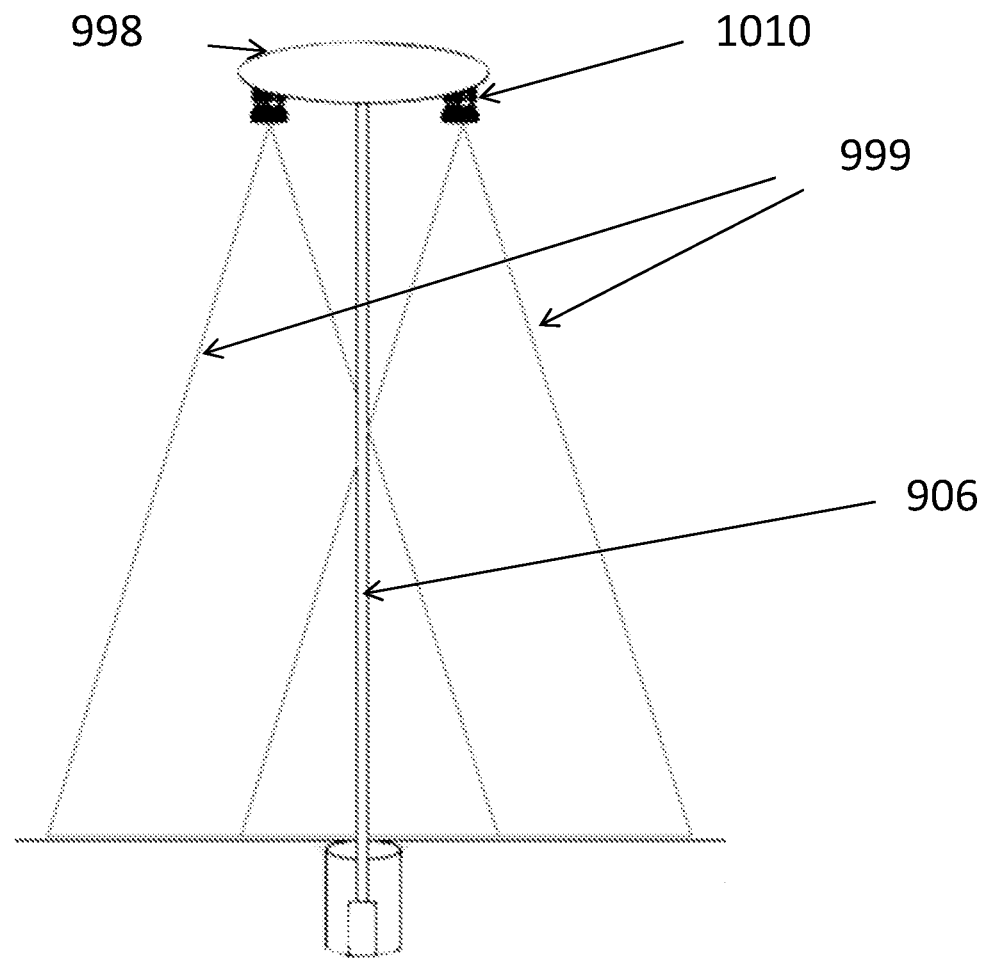
FIG. 20 is a side view schematic of the system shown in FIG. 10 having two lenses.

FIG. 20 shows a side elevational view of at least one camera 1010 or camera array and a housing 998 or enclosure to protect the at least one camera 1010 or related electronic device.

Figure 23:
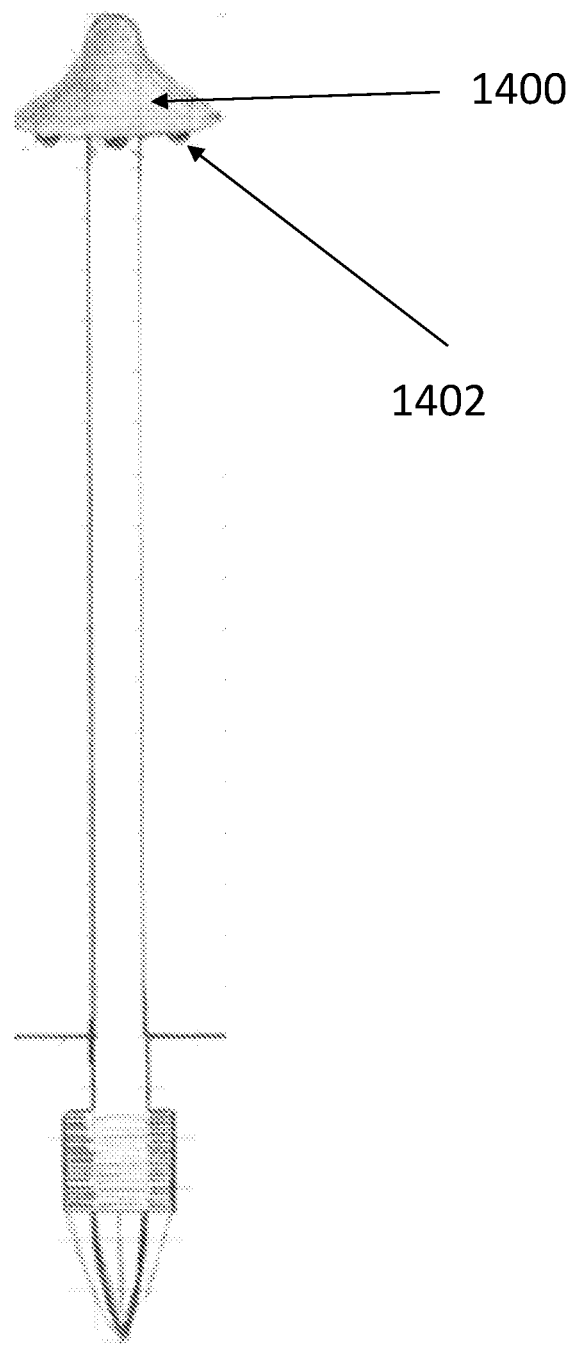
FIG. 23 is a side elevational view of a camera or camera array and a housing or enclosure to protect any camera or related electronic device.

FIG. 23 shows a side elevational view of at least one camera 1010 or camera array and a housing 998 or enclosure to protect the at least one camera 1010 or related electronic device.

Figure 24:
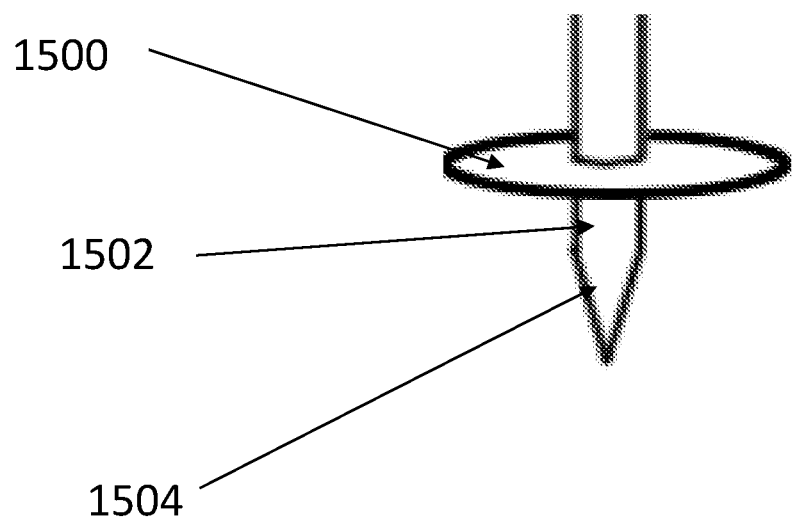
FIG. 24 is a top side perspective view of an alternate securing device.

FIG. 24 is a top side perspective view of an alternate securing device. The device is retrofit to secure into a standard 4.25" golf cup aka hole, anchored with an approximately 4-4.25" low flex contoured horizontal stabilizer 1500, a 1" plug 1502 that indwells in the 1" female opening in the center of the bottom of a standard or typical golf cup, and a spike 1504 the extends off the plug to protrude through the 1" female hole in the cup and into the ground beneath.

Figure 25:
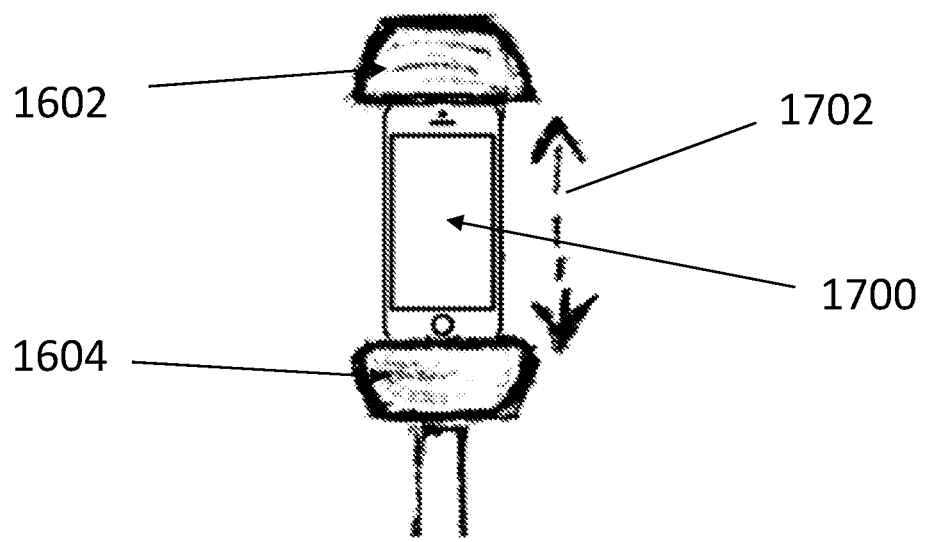
FIG. 25 shows a front elevational view of a camera device holder which may position a mobile device or capturing device camera in any direction.
Figure 26:
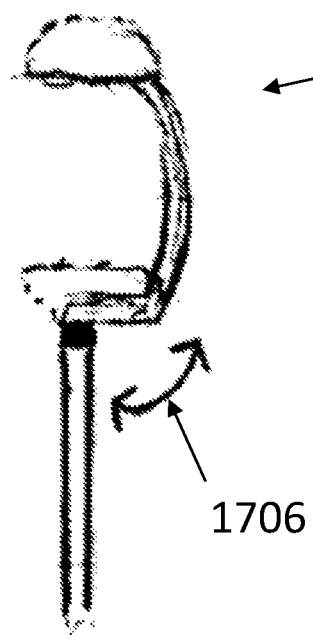
FIG. 26 shows a side elevational view of the camera device holder shown in FIG. 25.
Figure 27:
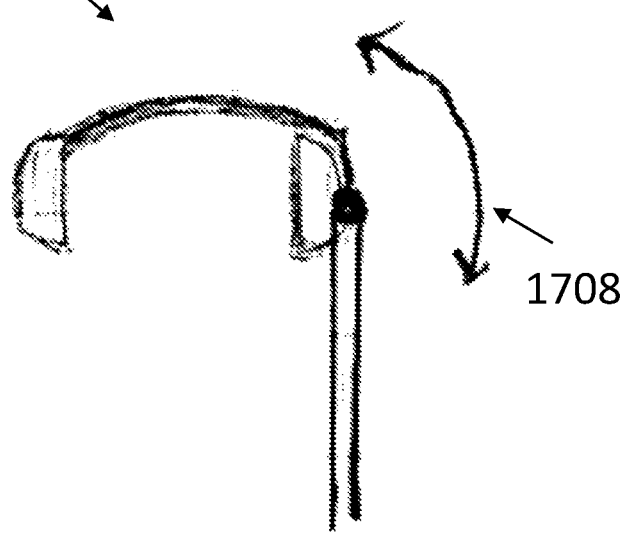
FIG. 27 shows a side elevational view of the camera device holder shown in FIG. 25 with the holder in a downward facing swiveled position.

FIGS. 25-27 show a camera device holder which may position the camera in any direction. The camera device holder may be a rotatable camera/smartphone dock, cradle, holder, stand or mount for securing a camera, smartphone or other mobile device for recording video or other training footage in any direction. The camera device holder may be of any type although FIGS. 25-27 show a camera device holder which may clamp to edges of a camera device being used to record. FIG. 25 shows the camera device holder 1600 with a smartphone 1700 secured in the camera device holder 1600. The camera device holder 1600 has a first and second gripping pads 1602, 1604 which translate in the direction of arrow 1702 and rotate in the direction of arrows 1706, 1708 will serve golfers when they wish to use a camera or mobile device to capture a) images or video of their golf balls rolling to the golf target cup, or b) images or video of themselves putting golf balls, or c) a combination of both. The device is adjustable with 360° rotation in all directions. The pole between the securing device and the camera device holder may be any length with preferred lengths between 6" to 60" for enabling positioning for image capture in all directions.

Figure 9:
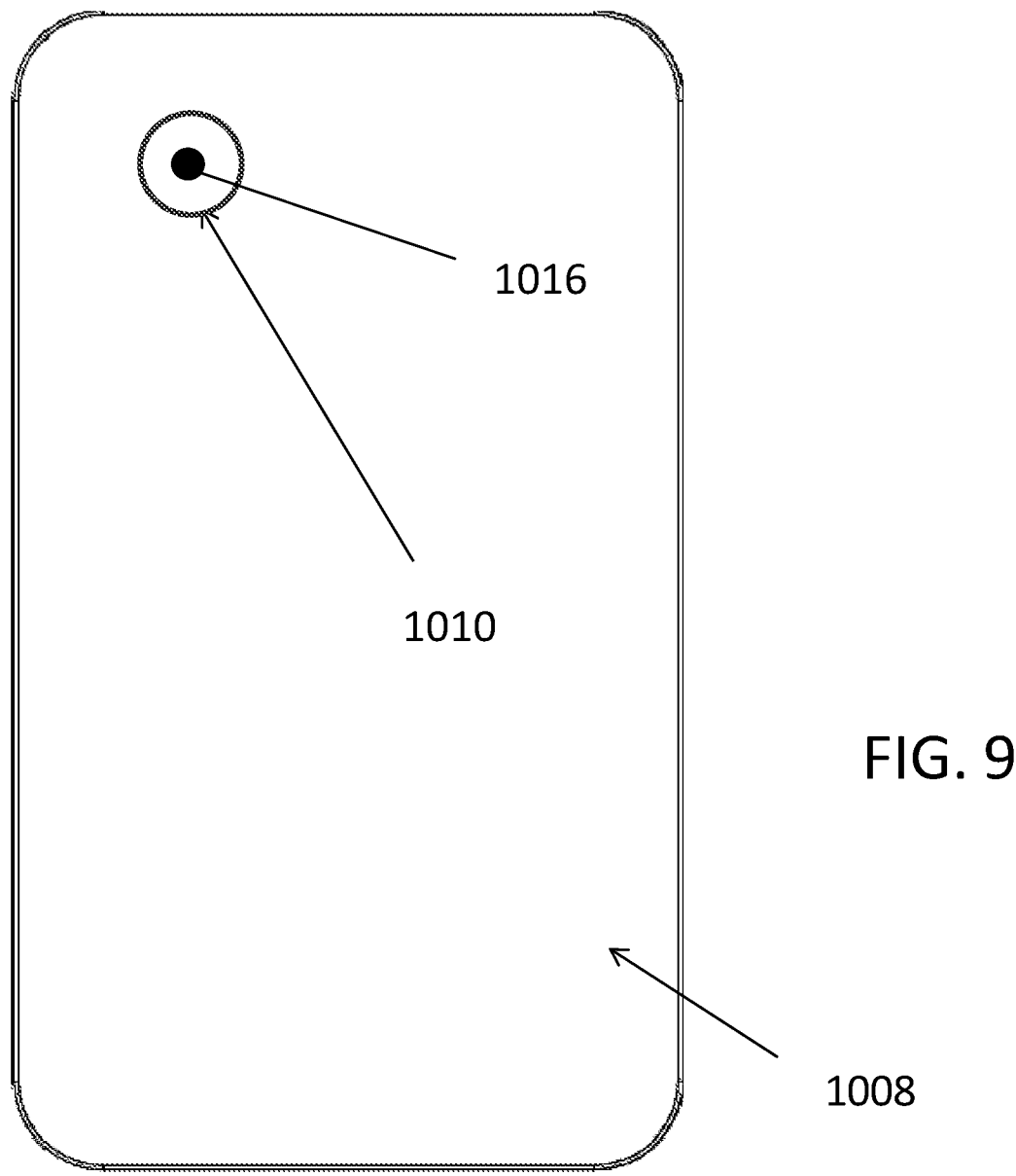
FIG. 9 is bottom plan view of a mobile device or capturing device of the golf training system according to the present invention.
Figure 10:
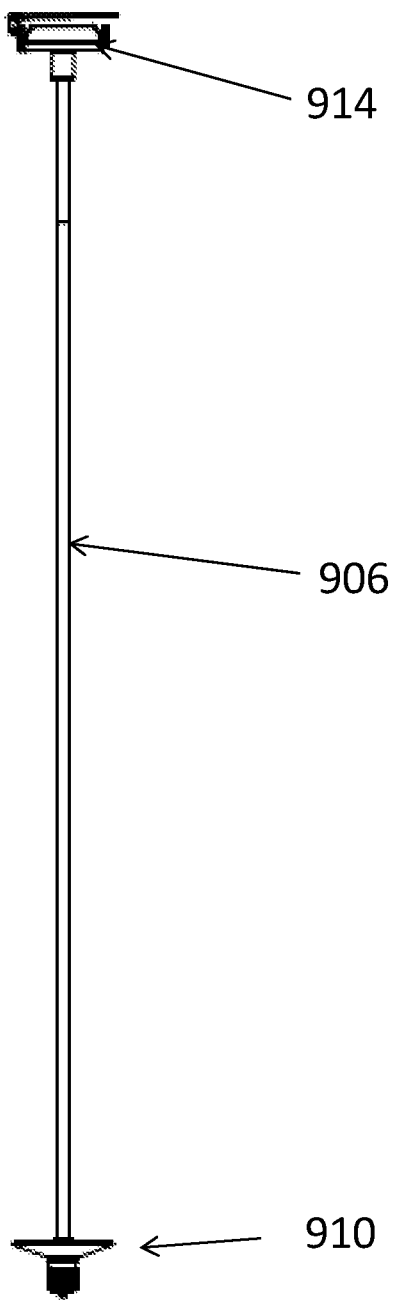
FIG. 10 is a front elevational view of the golf training system according to the present invention.
Figure 11:
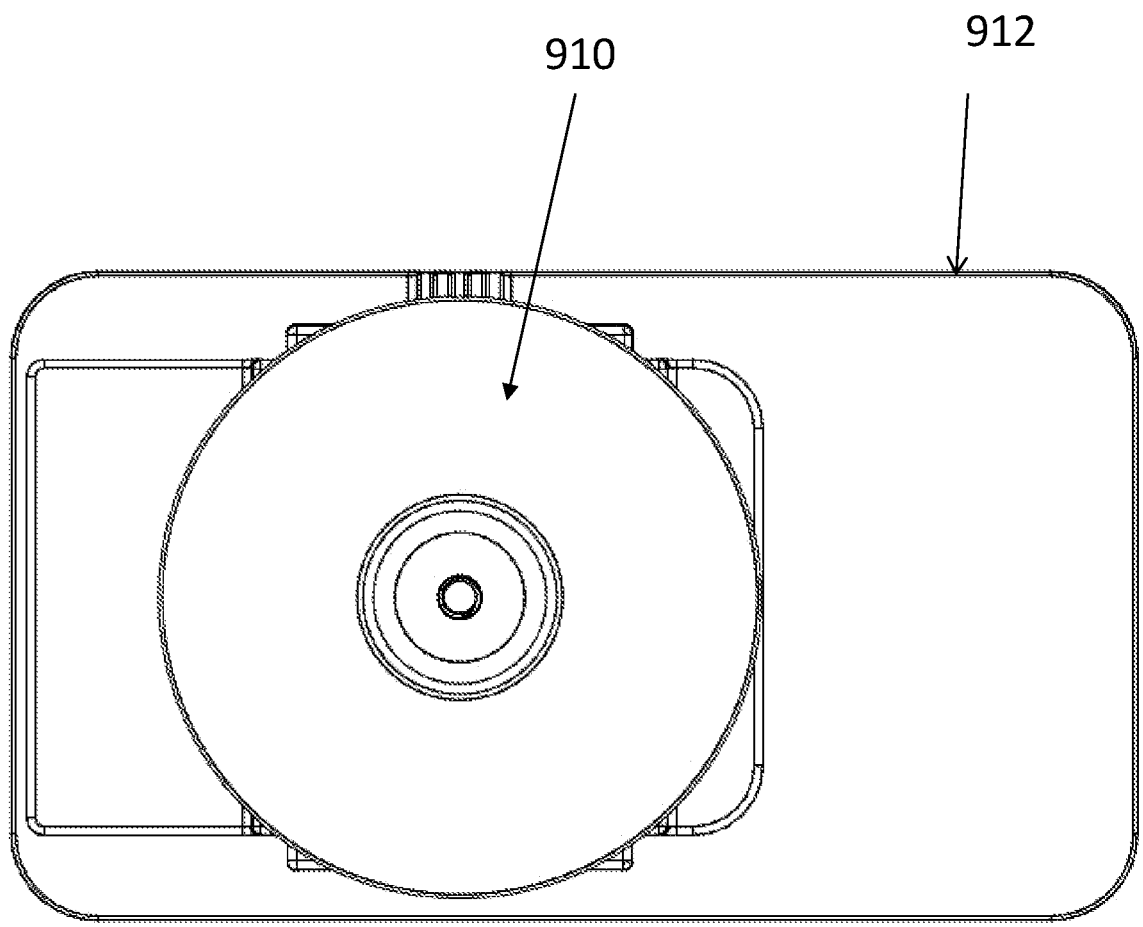
FIG. 11 is a bottom plan view of the golf training system shown in FIG. 10.
Figure 12:
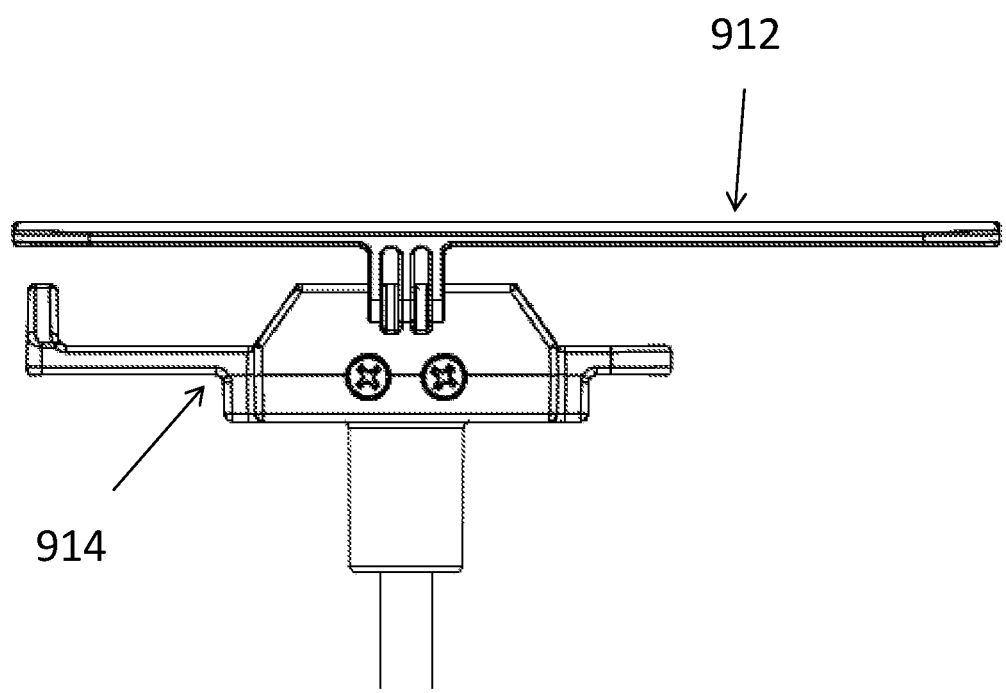
FIG. 12 is a side view of an upper portion of the system shown in FIG. 10.
Figure 13:
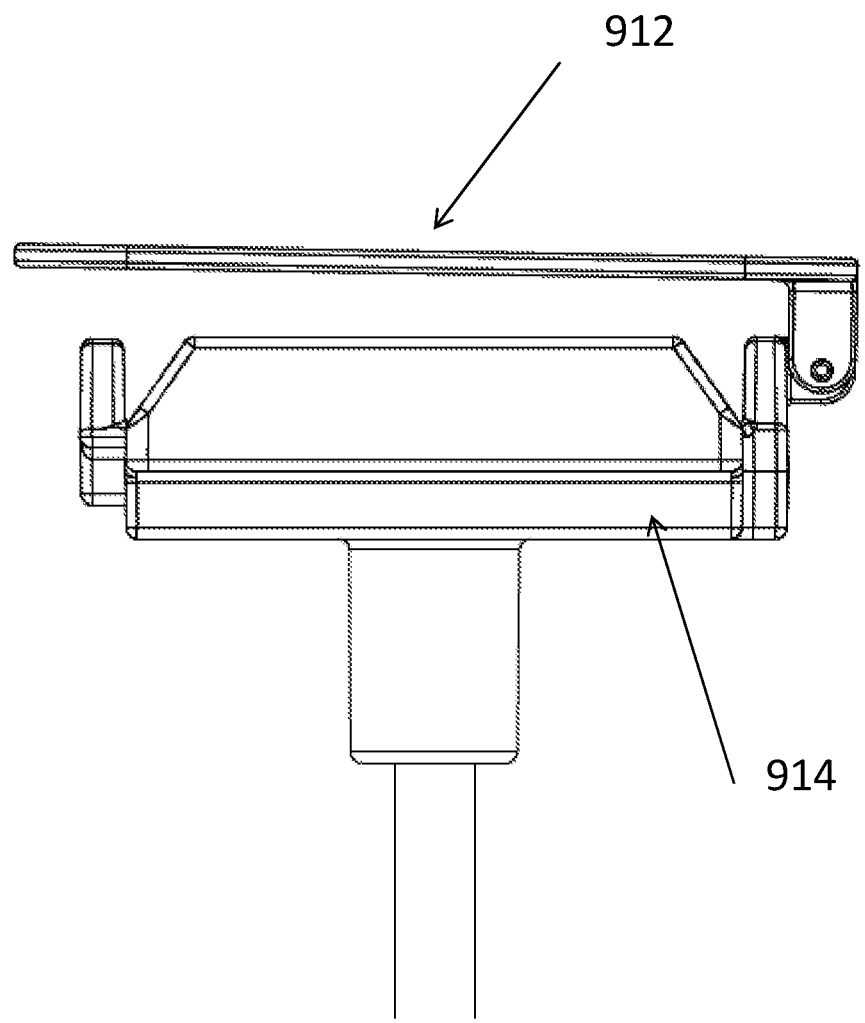
FIG. 13 is a front view of an upper portion of the system shown in FIG. 10.
Figure 14:
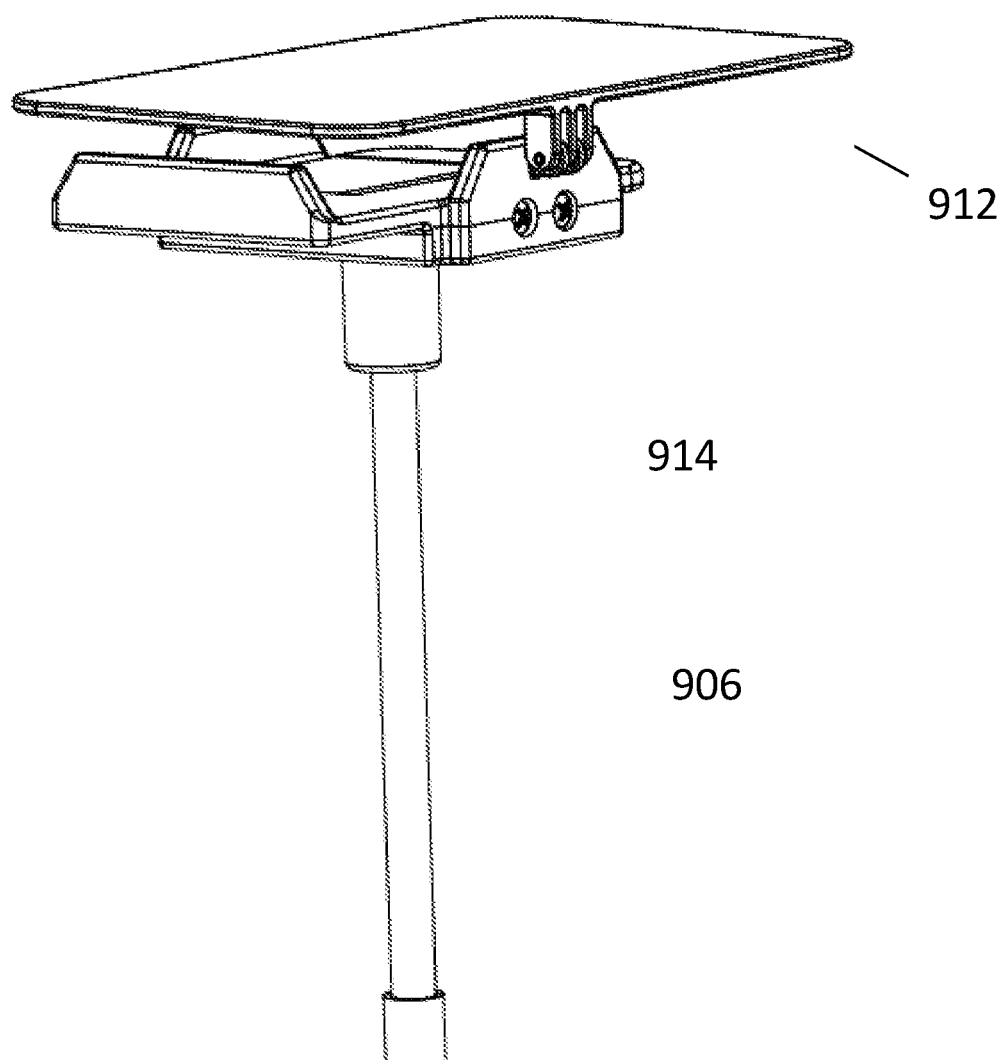
FIG. 14 is a perspective view of an upper portion of the system shown in FIG. 10.
Figure 15:
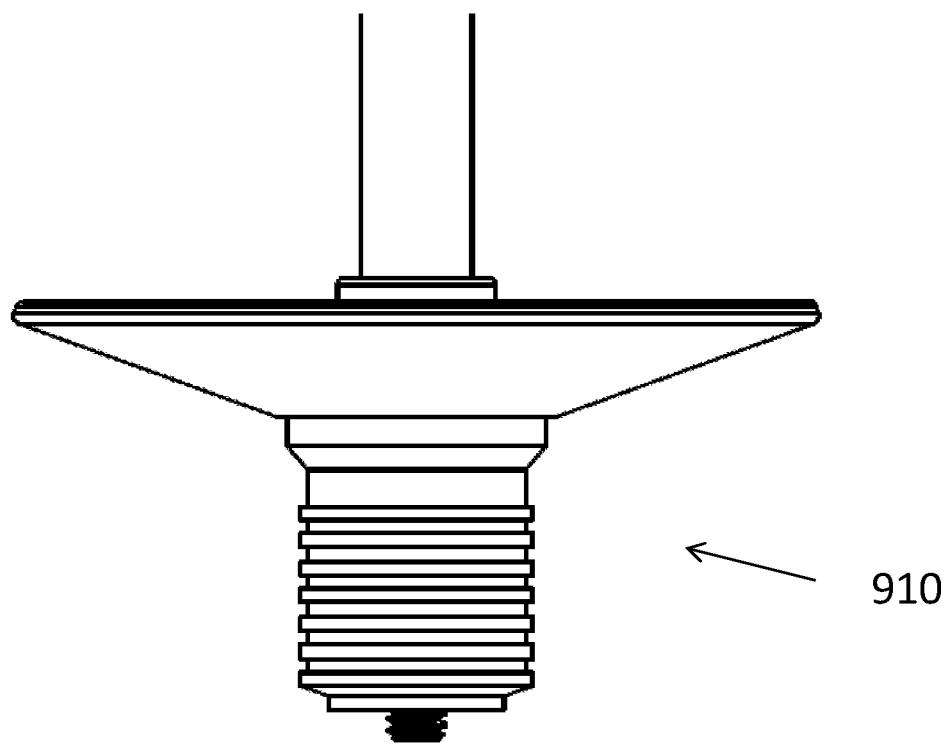
FIG. 15 is a side view of a lower portion of the golf training and platform showing the securing device.
Figure 16:
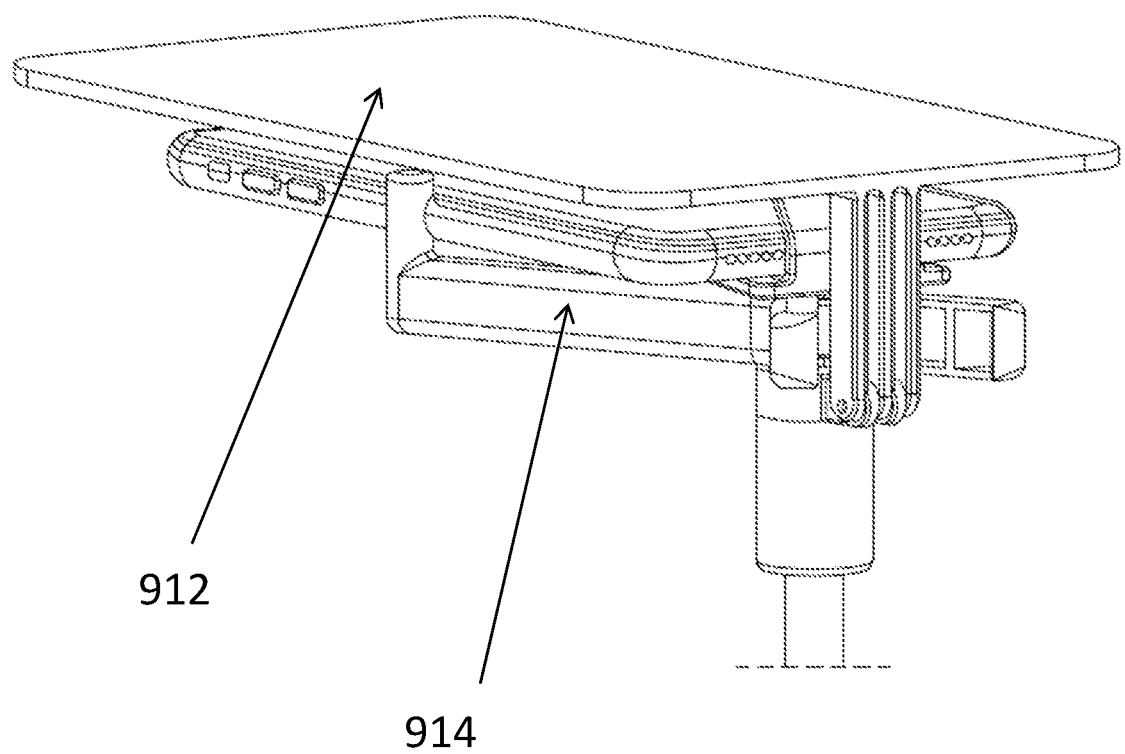
FIG. 16 is a perspective view of an upper portion of the system shown in FIG. 10.
Figure 17:
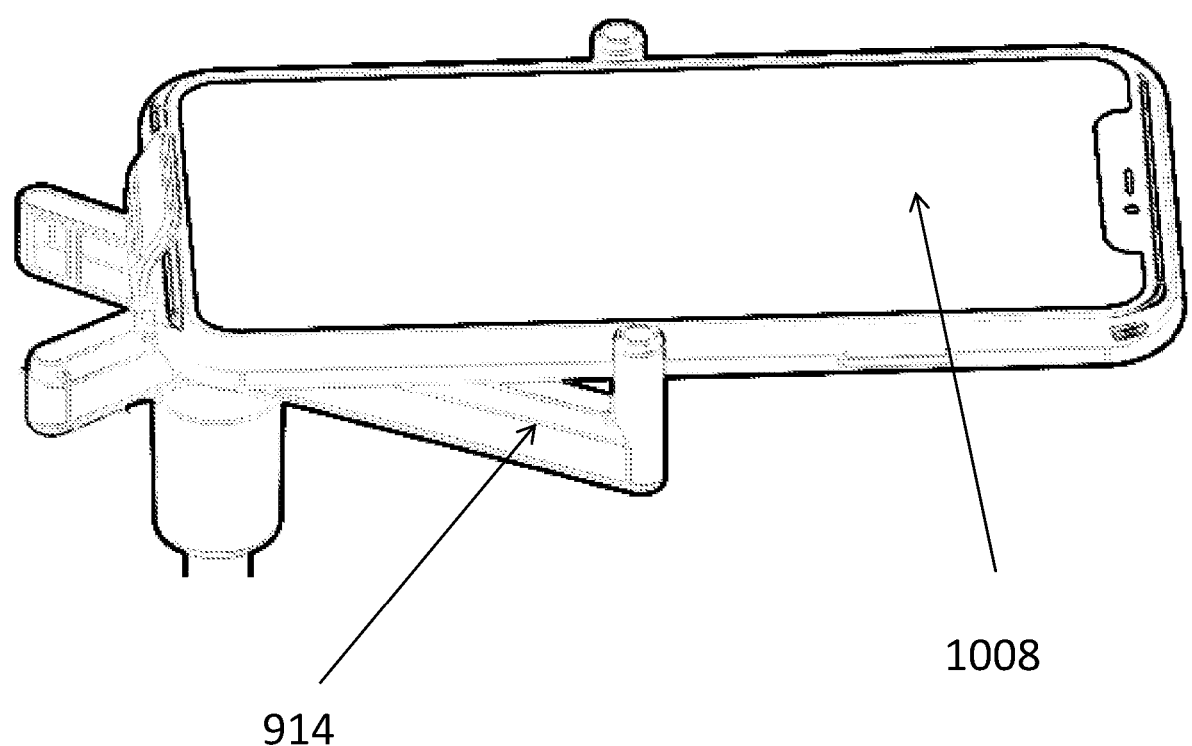
FIG. 17 is another perspective view of an upper portion of the system shown in FIG. 10.
Figure 18:
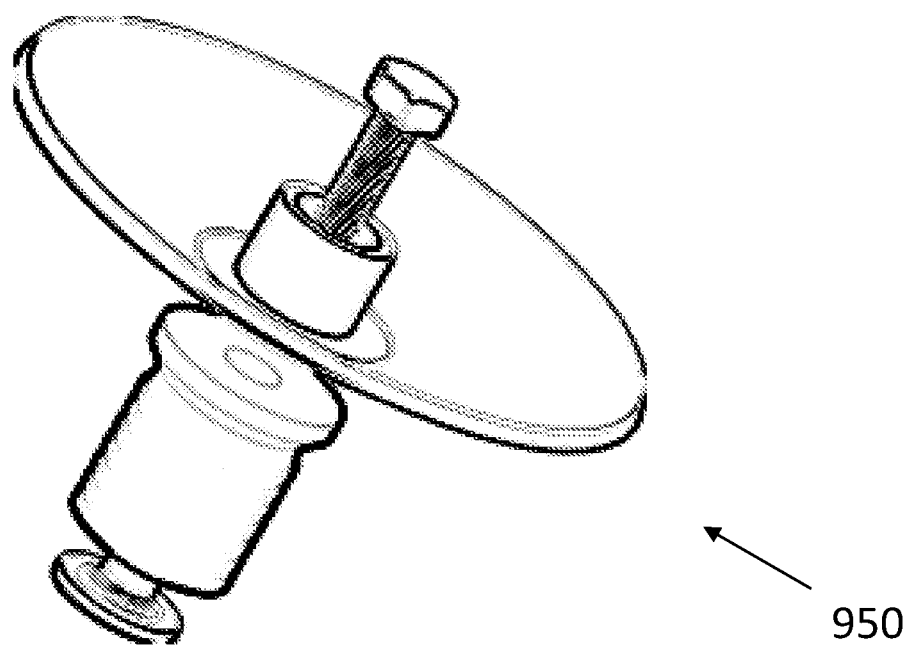
FIG. 18 is a perspective view of the underside of the securing device.
Figure 19:
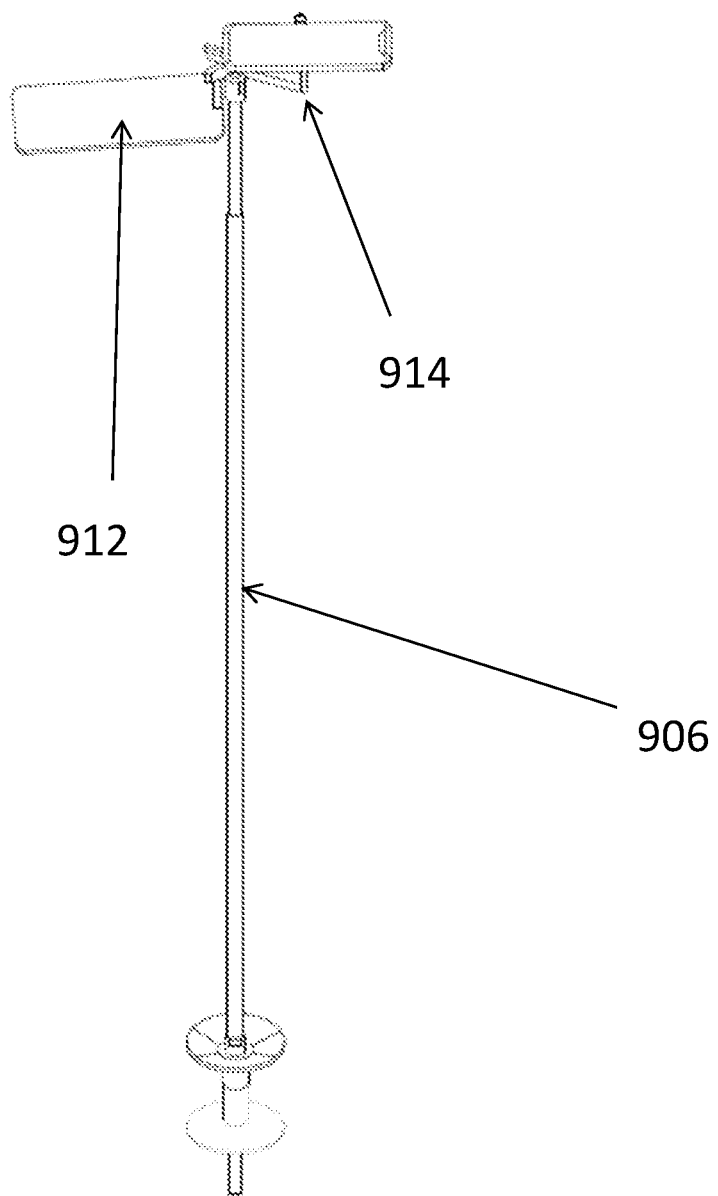
FIG. 19 is a perspective view of the system shown in FIG. 10.
Figure 21:
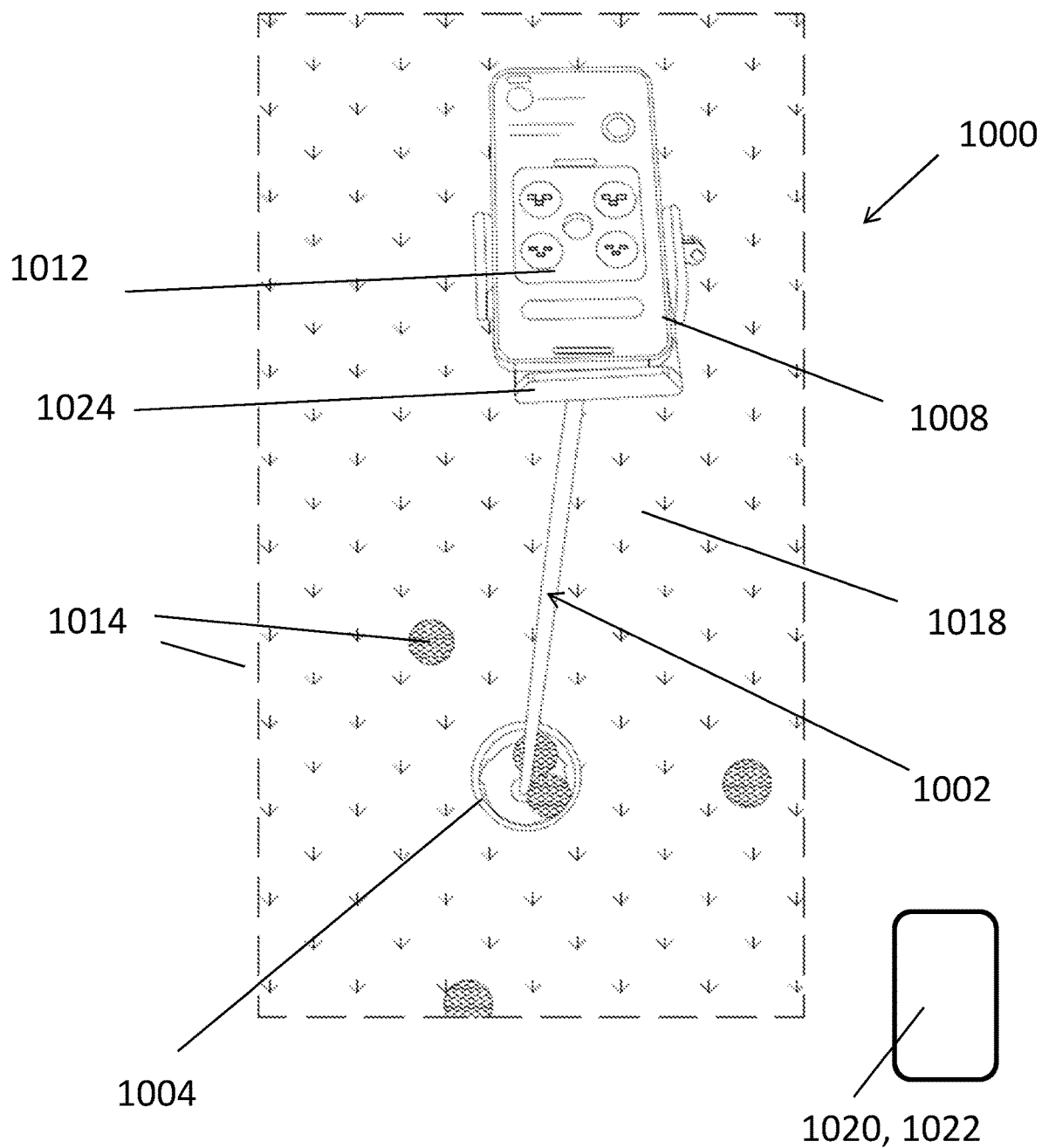
FIG. 21 is a top perspective view of another embodiment of the golf training system and platform according to the present invention.
Figure 22:
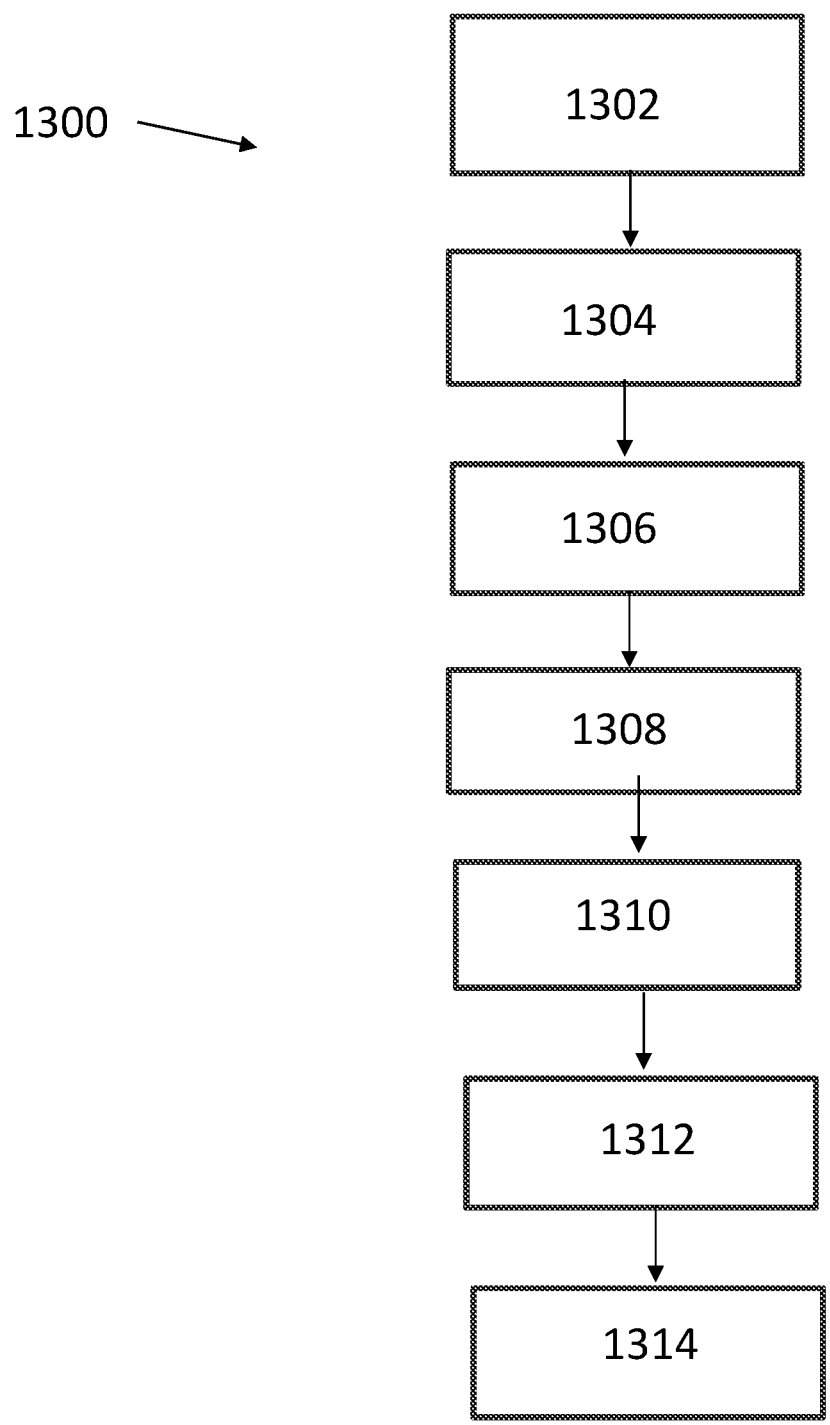
FIG. 22 is a flowchart showing a method for using the golf training system and platform according to the present invention.

Another aspect of the present invention as shown in FIG. 21 is directed to a system 1000 for detecting, tracking, measuring and analyzing putting performance of a golfer. FIG. 9 is bottom plan view of the mobile device or capturing device of the golf training system according to the embodiment of FIG. 21.

The system 1000 includes a pole 1002 securable in a golf hole cup 1004 and a securing device 950 (FIG. 25) disposed at a lower end of the pole 1002 insertable into a golf hole cup 1004, the securing device 950 for engaging an interior surface of the golf hole cup 1004. The system 100 includes a mobile device 1008 having at least one camera 1010 (FIG. 9) and viewing screen 1012, the mobile device 1008 mounted on an upper portion of the pole 1002 for detecting, tracking, measuring and analyzing putted golf balls and associated golfer performance data, the camera directed substantially 90 degrees downward toward the golf hole cup 1004. The golfer performance data may be data such as presented in the charts in FIGS. 6A-6F. The at least one camera 1010 includes at least one active lens 1016 which detects a golf ball 1014 as the golf ball 1014 enters a field of view of the at least one camera 1010, tracks the golf ball 1014 as the golf ball travels along the putting green 1018 and stores a path of the golf ball for analysis. The system 1000 includes software on the mobile device 1008 including algorithm steps which analyze individual performance measurements and provide feedback and instruction based on data captured by the mobile device 1008. The system tracks and records the path and stopping point coordinates of the golf ball 1014 in relation to the golf hole cup 1004 and the system 1000 saves the data and analysis for individual performance. The system 1000 analyzes the captured data to formulate assessments of golfer performance and uses the assessments of the golfer performance to provide output to the golfer including analysis both in numerical, graphical and narrative form including the assessments. The system 1000 provides suggestions, and tracks and outputs improvements in golfer performance over various time periods. The system 1000 may include a second device 1020 in communication with the mobile device 1012. The second device 1020 may be a second user mobile device 1022 and wherein a second user is another player, and the second user mobile device 1022 may be exchangeable with the mobile device 1008 on the upper portion of the pole 1002. The second device 1020 may be a central base station. The second device 1020 may be a second user mobile device 1022 whereby the mobile device 1008 and the second user mobile device 1022 are connected to a central base station for gaming. The pole 1002 may be a telescoping or folding pole. The system 1000 may include a screen shield 912 (FIG. 13) rotatable from a first position wherein the screen shield 912 covers a screen on the mobile device to a second position wherein the screen shield is away from the viewing screen 1012 on the mobile device 1008. The securing device 950 may be expandable for providing a friction fit in the golf hole cup 1004. The system 1000 may include a mobile device holder 1024 securable to a top portion of the pole 1002, the mobile device holder 1024 for positioning the camera 1010 toward the golf hole cup 1004, allowing for vector-based tracking, Cartesian tracking, or radially based tracking and processing of the tracked information. The system 1000 may be a gaming platform whereby the mobile device viewing screen 1012 simulates a top field view including the golf hole cup 1004 utilizes extended reality programming to enabling users to play competitive games with real balls and equipment, whereby the system automates scoring and game rules during play as opposed to existing methods of human observation; providing visual and audible output in various forms as each game is designed to provide entertainment, including extended reality. The output may include scoring, statistics, trends, comparative analysis, instruction, drills, resources, equipment suggestions and content.

Another aspect of the present invention as shown in FIG. 28 is directed to a system 900 for detecting, tracking, measuring and analyzing putting performance of a golfer. The system 1000 includes a pole 1002 securable in a golf hole cup 1004 and a securing device 950 (FIG. 25) disposed at a lower end of the pole 1002 insertable into a golf hole cup 1004, the securing device 950 for engaging an interior surface of the golf hole cup 1004. The system 1000 includes a capturing device 1008 including a camera 1010 (FIG. 9), the capturing device 1008 mounted on an upper portion of the pole 1002 for detecting, tracking, measuring and analyzing putted golf balls and associated golfer performance data. The camera 1010 is directed substantially 90 degrees downward toward the golf hole cup 1004, wherein the camera 1010 includes at least one active lens 1016 which detects a golf ball 1014 as the golf ball 1014 enters the camera field of view. The system 1000 includes software on the capturing device 1008 having steps which analyze individual performance measurements and provide feedback and instruction based on data captured by the capturing device 1008. The capturing device 1008 tracks the golf ball 1014 as the golf ball travels along the putting green 1018 and stores the path of the golf ball 1014 for analysis. The system 1000 saves the data and analysis for individual performance. The system 1000 analyzes the captured data to formulate assessments of the golfer performance and uses the assessments to provide output to the user including analysis both in numerical and graphical form including the assessments. The system 1000 provides suggestions and tracks and outputs improvements in a golfer performance over various time periods. The capturing device 1008 may be a mobile device. The system 1000 may include a second device 1020 in communication with the capturing device 1008. The second device may be a second user mobile device and wherein the second user is another player, and the second user mobile device may be exchangeable with the mobile device on the upper portion of the pole. The second device may be a central base station. The second device may be a second user mobile device whereby the mobile device and the second user mobile device are connected to a central base station for gaming.

Another aspect of the present invention as shown in FIG. 28 is directed to a gaming platform 1000 for golf. The gaming platform 1000 includes a pole 1002 securable above a golf hole cup 1004 and a capturing device 1008 including a camera 1010 (FIG. 9) and viewing screen 1012. The capturing device 1008 is mounted on an upper portion of the pole 1002 for detecting, tracking, measuring and analyzing putted golf balls and associated golfer performance data. The camera 1010 is directed substantially 90 degrees downward toward the golf hole cup 1004. The camera 1010 includes at least one active lens 1016 which detects a golf ball 1014 as the golf ball 1014 enters the camera field of view, tracks the golf ball as the golf ball 1014 travels along the putting green 1018 and stores the path of the golf ball for analysis. The capturing device includes software having steps which analyze individual performance measurements captured by the capturing device. The system 1000 saves the data and analysis for individual performance. The system 1000 uses the path of a golf ball in the analysis. The system 1000 analyzes the captured data to provide competitive statistics of users of the gaming platform. The mobile device screen simulates a top field view including a golf hole, enabling users to play competitive games, including live over a wireless communication system, against themselves, against the app, or against other players. The capturing device may be a mobile device.

Another aspect of the present invention includes a method for using the system shown in FIG. 28. The method is shown in the flowchart 1300 of FIG. 29. The system 1000 includes a pole 1002 securable in a golf hole cup 1004 and a securing device 950 (FIG. 25) disposed at a lower end of the pole 1002 insertable into a golf hole cup 1004, the securing device 950 for engaging an interior surface of the golf hole cup 1004. The system 100 includes a mobile device 1008 having at least one camera 1010 (FIG. 9) and viewing screen 1012, the mobile device 1008 mounted on an upper portion of the pole 1002 for detecting, tracking, measuring and analyzing putted golf balls and associated golfer performance data, the camera directed substantially 90 degrees downward toward the golf hole cup 1004. The golfer performance data may be data such as presented in the charts in FIGS. 6A-6F. The at least one camera 1010 includes at least one active lens 1016 which detects a golf ball 1014 as the golf ball 1014 enters a field of view 999 (FIG. 27) of the at least one camera 1010, tracks the golf ball 1014 as the golf ball travels along the putting green 1018 and stores a path of the golf ball for analysis. The system 1000 includes software on the mobile device 1008 including algorithm steps which analyze individual performance measurements and provide feedback and instruction based on data captured by the mobile device 1008. The system tracks and records the path and stopping point coordinates of the golf ball 1014 in relation to the golf hole cup 1004 and the system 1000 saves the data and analysis for individual performance. The system 1000 analyzes the captured data to formulate assessments of golfer performance and uses the assessments of the golfer performance to provide output to the golfer including analysis both in numerical, graphical and narrative form including the assessments. The system 1000 provides suggestions, and tracks and outputs improvements in golfer performance over various time periods. The method for using the system includes ensuring the pole is secured in the golf hole cup 1302, ensuring the mobile device is secured on the upper portion of the pole 1304, the camera directed substantially 90 degrees downward toward the golf hole cup and activating the software on the mobile device. The method includes the golfer hitting the golf ball on the putting green 1306. The method includes the system tracking and recording path and stopping point coordinates of the golf ball in relation to the golf hole cup 1308. The method includes the system saving the data and analysis for individual performance 1310 and the system analyzing the captured data to formulate assessments of golfer performance and uses the assessments of the golfer performance to provide output to the golfer 1312 including analysis both in numerical, graphical and narrative form including the assessments. The method includes the system providing suggestions, and tracking and outputting improvements in golfer performance over various time periods 1314.

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A system for detecting, tracking, measuring and analyzing putting performance of a golfer comprising:
   a pole securable in a golf hole cup;
   a securing device disposed at a lower end of the pole insertable into a golf hole cup on a putting green, the securing device for engaging an interior surface of the golf hole cup;
   a mobile device including at least one camera and viewing screen, the mobile device mounted on an upper portion of the pole for detecting, tracking, measuring and analyzing putted golf balls and associated golfer performance data, the camera directed substantially 90 degrees downward toward the golf hole cup, wherein the at least one camera includes at least one active lens which detects a golf ball as the golf ball enters a field of view of the at least one camera, tracks the golf ball as the golf ball travels along the putting green and stores a path and stopping point coordinates of the golf ball in relation to the golf hole cup for analysis; and
   software on the mobile device including algorithm steps which analyze individual performance measurements and provide feedback and instruction based on data captured by the mobile device;

wherein the system tracks and records the path of the golf ball and the stopping point coordinates of the golf ball in relation the golf hole cup;

wherein the system saves the data and analysis for individual performance profile;

wherein the system analyzes the captured data to formulate assessments of golfer performance and uses the assessments of the golfer performance to provide output to the golfer including analysis in numerical, graphical and narrative form including the assessments; and wherein the system provides suggestions, and identifies and outputs changes and trends in golfer performance over various time periods.

2. The system according to claim 1 including a second device in communication with the mobile device.

3. The system according to claim 2, wherein the second device is a second user mobile device and wherein the second user is another player, and the second user mobile device may be exchangeable with the mobile device on the upper portion of the pole.

4. The system according to claim 2, wherein the second device is a central base station.

5. The system according to claim 2 wherein the second device is a second user mobile device whereby the mobile device and the second user mobile device are connected to a central base station for gaming.

6. The system according to claim 1 wherein the system measures and records baseline data including length of putt, and slope and break of the putting green.

7. The system according to claim 1 including a screen shield rotatable from a first position wherein the screen shield covers a screen on the mobile device to a second position wherein the screen shield is away from the screen on the mobile device.

8. The system according to claim 1 including a mobile device holder securable to a top portion of the pole, the mobile device holder for positioning the camera toward the golf hole cup, allowing for vector-based, radially based or cartesian based tracking and processing.

9. The system according to claim 1 wherein the system is a gaming platform whereby the mobile device screen simulates a top field view including the golf hole cup and utilizes extended reality programming to enable users to play games with real balls and equipment, whereby the system automates scoring and game rules during play as opposed to existing methods of human observation; providing visual and audible output in various forms as each game is designed to provide entertainment.

10. The system according to claim 1 wherein the output includes at least graphics, scoring, statistics, trends, comparative analysis, instruction, drills, resources, equipment suggestions and content.

11. A system for detecting, tracking, measuring and analyzing putting performance of a golfer comprising:

a pole securable in a golf hole cup;

a securing device disposed at a lower end of the pole insertable into a golf hole cup, the securing device for engaging an interior surface of the golf hole cup;

a capturing device including at least one camera, the capturing device mounted on an upper portion of the pole for detecting, tracking, measuring and analyzing putted golf balls and associated golfer performance data, the at least one camera directed substantially 90 degrees downward toward the golf hole cup, wherein the at least one camera includes at least one active lens which detects a golf ball as the golf ball enters a field of view of the at least one camera; and software on the capturing device including algorithm steps which analyze individual performance measurements and provide feedback and instruction based on data captured by the capturing device;

wherein the capturing device tracks the golf ball as the golf ball travels along the putting green and stores a path and stopping point coordinates of the golf ball in relation to the golf hole cup for analysis;

wherein the system saves the data and analysis for individual performance;

wherein the system analyzes the captured data to formulate assessments of the golfer performance and uses the assessments to provide output to the golfer including analysis in numerical, narrative and graphical form including the assessments; and wherein the system provides suggestions, and identifies and outputs changes and trends in golfer performance over various time periods.

12. The system according to claim 11 including a capturing device holder securable to a top portion of the pole, the capturing device holder for positioning the camera toward the golf hole cup, allowing for vector-based, radially based or cartesian based tracking and processing.

13. The system according to claim 11 including a second device in communication with the capturing device.

14. The system according to claim 13, wherein the second device is a second user mobile device and wherein the second user is another player, and the second user mobile device may be exchangeable with the capturing device on the upper portion of the pole.

15. The system according to claim 13, wherein the second device is a central base station.

16. The system according to claim 13 wherein the second device is a second user mobile device whereby the capturing device and the second user mobile device are connected to a central base station for gaming.

17. The system according to claim 11 wherein the system measures and records baseline data including length of putt, and slope and break of the putting green.

18. A gaming platform for golf, the gaming platform comprising:

a pole securable above a golf hole cup;

a capturing device including at least one camera and viewing screen, the capturing device mounted on an upper portion of the pole for detecting, tracking, measuring and analyzing putted golf balls and associated golfer performance data, the at least one camera directed substantially 90 degrees downward toward the golf hole cup, wherein the at least one camera includes at least one active lens which detects a golf ball as the golf ball enters a field of view of the at least one camera, tracks the golf ball as the golf ball travels along the putting green and stores a path and stopping point coordinates of the golf ball in relation to the golf hole cup for analysis; and software on the capturing device including algorithm steps which analyze individual performance measurements captured by the capturing device;

wherein the gaming platform saves the data and analysis for individual performance profile;

wherein the gaming platform uses the path of a golf ball in the analysis;

wherein the gaming platform analyzes the captured data to provide competitive statistics of users of the gaming platform; and wherein the capturing device screen simulates a top field view including a golf hole, enabling users to play competitive games, including live over a wireless communication system, against themselves, against an app of the gaming platform, or against other players.

19. The gaming platform of claim 18 wherein the capturing device is a mobile device.

20. A method for using the system according to claim 1 comprising:
ensuring the pole is secured in the golf hole cup;
ensuring the mobile device is secured on the upper portion of the pole, the camera directed substantially 90 degrees downward toward the golf hole cup;
activating the software on the mobile device;
the golfer hitting the golf ball on the putting green;
the system tracking and recording the path and stopping point coordinates of the golf ball in relation to the golf hole cup;
the system saving the data and analysis for individual performance;
the system analyzing the captured data to formulate assessments of golfer performance and uses the assessments of the golfer performance to provide output to the golfer including analysis both in numerical, graphical and narrative form including the assessments; and
the system providing suggestions, and tracking and outputting improvements in golfer performance over various time periods.

* * * * *